US008583578B2

(12) United States Patent
Sato

(10) Patent No.: US 8,583,578 B2
(45) Date of Patent: Nov. 12, 2013

(54) METHOD AND SYSTEM FOR SUPPORTING DESIGN

(75) Inventor: Hiroshi Sato, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 1732 days.

(21) Appl. No.: 11/684,795

(22) Filed: Mar. 12, 2007

(65) Prior Publication Data

US 2007/0213849 A1 Sep. 13, 2007

(30) Foreign Application Priority Data

Mar. 13, 2006 (JP) ................................. 2006-066906

(51) Int. Cl.
*G06F 17/00* (2006.01)
*G06N 5/00* (2006.01)

(52) U.S. Cl.
USPC .......................................................... 706/45

(58) Field of Classification Search
USPC .......................................................... 706/45
See application file for complete search history.

(56) References Cited

U.S. PATENT DOCUMENTS

| | | | | |
|---|---|---|---|---|
| 5,586,022 A * | 12/1996 | Arimoto et al. | ................. | 700/97 |
| 5,717,598 A * | 2/1998 | Miyakawa et al. | ........... | 700/103 |
| 6,334,096 B1 | 12/2001 | Hiroshige et al. | | |
| 7,689,523 B2 * | 3/2010 | Sato | ................................ | 706/45 |
| 2001/0037282 A1 * | 11/2001 | Yoneda | ............................ | 705/37 |
| 2002/0107780 A1 * | 8/2002 | Suzuki et al. | .................... | 705/37 |
| 2004/0260592 A1 * | 12/2004 | George et al. | ...................... | 705/8 |
| 2007/0116215 A1 * | 5/2007 | George et al. | ............. | 379/114.01 |

FOREIGN PATENT DOCUMENTS

| | | |
|---|---|---|
| JP | 10-334151 | 12/1998 |
| JP | 2003-039260 | 2/2003 |
| JP | 2006-018541 | 1/2006 |
| JP | 2006-302192 | 11/2006 |
| WO | 94/15308 A1 | 7/1994 |
| WO | 99/36871 A1 | 7/1999 |

OTHER PUBLICATIONS

Mann, Darrell et al, "Matrix 2003: Updating the TRIZ Contradiction Matrix", CREAX Press, Belgium, 2003, Chapters 2, 3, 4.2 and table Matrix 2003.

* cited by examiner

*Primary Examiner* — Michael B Holmes
(74) *Attorney, Agent, or Firm* — Mattingly & Malur, PC

(57) ABSTRACT

A method and system for determining an optimal improvement measure for a product assembling time and a defective assembly generated in an assembling process. This is achieved by extracting an assembling element having a high assembling time and a high defective assembly potential from similar assembling operations and extracting a concrete improvement guideline from extracted improvement guidelines and the parts, the assembling operations, and the attributes associated with the extracted improvement guidelines.

4 Claims, 28 Drawing Sheets

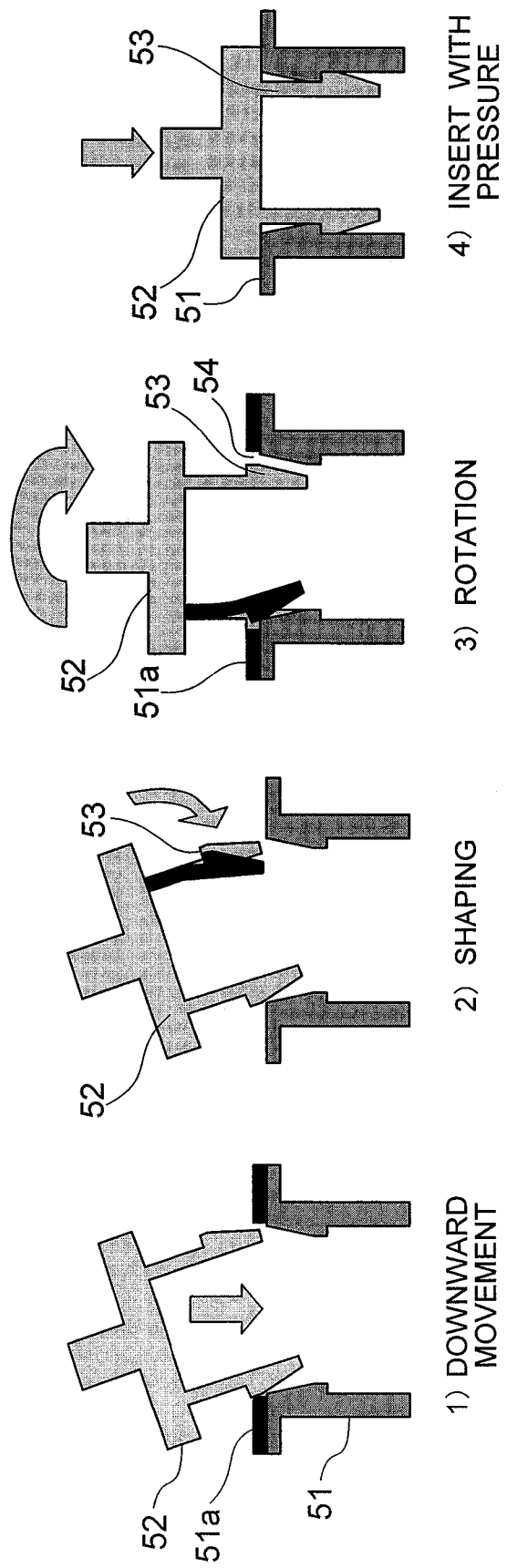

FIG. 4A

| ASSEMBLING OPERATION | ATTRIBUTE |
|---|---|
| DOWNWARD | AESTHETIC SURFACE |
| DEFORMING | HIDDEN |
| ROTATIONAL | MULTIPLE HOLES |
| CLINCHING | CONFINED |

FIG. 4B

| No | PART | | ASSEMBLING OPERATION | | ATTRIBUTE | | OPERATION TIME |
|---|---|---|---|---|---|---|---|
| | NAME | QUANTITY | NAME | NUMBER OF REPETITIONS | NAME | NUMBER OF REPETITIONS | |
| 1 | CASE | 1 | DOWNWARD | 1 | | | $t_{Downward 1}$ |
| 2 | SWITCHING LEVER | 1 | DOWNWARD | 1 | AESTHETIC SURFACE | 1 | $t_{Downward\ Aesthetic\ surface\ 1}$ |
| 3 | | | DEFORMING | 2 | | | $t_{Deforming\ 1}$ |
| 4 | | | ROTATIONAL | | AESTHETIC SURFACE | 1 | $t_{Rotational\ Aesthetic\ surface\ Hidden\ 1}$ |
| 5 | | | | | HIDDEN | 1 | |
| 6 | | | CLINCHING | | MULTIPLE HOLES | 1 | $t_{Clinching\ Multiple\ holes\ 31}$ |

| PART | ASSEMBLING OPERATION | ATTRIBUTE 1 | ATTRIBUTE 2 | ASSEMBLING TIME | ASSEMBLY DIFFICULTY COEFFICIENT CALCULATION EXAMPLE |
|---|---|---|---|---|---|
| CASE | DOWNWARD | | | $t_{Downward\ 1}$ | $t_{Downward\ 0} = (t_{Downward\ 1} + t_{Downward\ 2} + t_{Downward\ 3})/3$ |
| PART 1 | DOWNWARD | | | $t_{Downward\ 2}$ | $\alpha_{Downward} = 1$ |
| PART 2 | DOWNWARD | | | $t_{Downward\ 3}$ | |
| SWITCHING LEVER | DEFORMING | | | $t_{Deforming\ 1}$ | |
| PART 3 | DEFORMING | | | $t_{Deforming\ 2}$ | $\alpha_{Deforming} = ((t_{Deforming\ 1} + t_{Deforming\ 2} + t_{Deforming\ 3})/3) / t_{Downward\ 0}$ |
| PART 4 | DEFORMING | | | $t_{Deforming\ 3}$ | |
| PART 5 | ROTATIONAL | | | $t_{Rotational\ 1}$ | |
| PART 6 | ROTATIONAL | | | $t_{Rotational\ 2}$ | $\alpha_{Rotational} = ((t_{Rotational\ 1} + t_{Rotational\ 2} + t_{Rotational\ 3})/3) / t_{Downward\ 0}$ |
| PART 7 | ROTATIONAL | | | $t_{Rotational\ 3}$ | |
| PART 8 | CLINCHING | | | $t_{Clinching\ 1}$ | |
| PART 9 | CLINCHING | | | $t_{Clinching\ 2}$ | $\alpha_{Clinching} = ((t_{Clinching\ 1} + t_{Clinching\ 2} + t_{Clinching\ 3})/3) / t_{Downward\ 0}$ |
| PART 10 | CLINCHING | | | $t_{Clinching\ 3}$ | |
| SWITCHING LEVER | DOWNWARD | AESTHETIC SURFACE | | $t_{Downward\ Aesthetic\ surface\ 1}$ | $\beta_{Aesthetic\ surface} = (t_{Downward\ Aesthetic\ surface\ 1}/t_{Downward\ 0} + t_{Rotational\ Aesthetic\ surface\ 1}/t_{Rotational\ 0} + t_{Rotational\ Aesthetic\ surface\ 1}/t_{Rotational\ Hidden\ 1})/3$ |
| PART 11 | ROTATIONAL | AESTHETIC SURFACE | | $t_{Rotational\ Aesthetic\ surface\ 2}$ | |
| SWITCHING LEVER | ROTATIONAL | AESTHETIC SURFACE | HIDDEN | $t_{Rotational\ Aesthetic\ surface\ Hidden\ 1}$ | |
| PART 12 | DOWNWARD | | HIDDEN | $t_{Downward\ Hidden\ 1}$ | $\beta_{Hidden} = (t_{Downward\ Hidden\ 1}/t_{Downward\ 0} + t_{Rotational\ Hidden\ 1}/t_{Rotational\ 0} + t_{Rotational\ Aesthetic\ surface\ Hidden\ 1}/t_{Rotational\ Aesthetic\ surface\ 2})/3$ |
| PART 13 | ROTATIONAL | | HIDDEN | $t_{Rotational\ Hidden\ 1}$ | |
| SWITCHING LEVER | CLINCHING | MULTIPLE HOLES | | $t_{Clinching\ 31}$ | $\beta_{Multiple\ holes\ 3} = ((t_{Clinching\ Multiple\ holes\ 31} + t_{Clinching\ Multiple\ holes\ 32} + t_{Clinching\ Multiple\ holes\ 33})/t_{Clinching\ 0})/3$ |
| PART 14 | CLINCHING | MULTIPLE HOLES | | $t_{Clinching\ 32}$ | |
| PART 15 | CLINCHING | MULTIPLE HOLES | | $t_{Clinching\ 33}$ | |

FIG. 6A

| PRODUCT | ASSEMBLING TIME/DEFECTIVE ASSEMBLY EXAMPLE IN THE PAST | | ASSEMBLING OPERATION ANALYSIS | | |
|---|---|---|---|---|---|
| | ASSEMBLING METHOD BEFORE IMPROVEMENT | IMPROVEMENT EXAMPLES | PART | ASSEMBLING OPERATION | ATTRIBUTE |
| VENTILATOR FAN | VENTILATOR FAN GOT CAUGHT IN THE STRING OF OPEN/CLOSE SWITCH | DIVIDE VENTILATOR OPEN/CLOSE SWITCH INTO A SWITCH BODY AND A STRING, ASSEMBLE THE SWITCH BODY FIRSTLY AND ASSEMBLE THE STRING LASTLY | OPEN/CLOSE SWITCH | | |
| | ROTATE VENTILATOR MOTOR AND PLACE AT POSITIONING BRACKET | WIDEN THE TIP END OF THE POSITIONING BRACKET OF VENTILATOR MOTOR AND ASSEMBLE IT WITH RECTILINEAR MOVEMENT | VENTILATOR MOTOR | ROTATIONAL | |
| | DEFORM VENTILATOR MOTOR WIRING | CONNECT VENTILATOR MOTOR DIRECTLY ONTO THE MOTOR CONTROL SUBSTRATE | VENTILATOR MOTOR | DEFORMING | |
| | WHEN A FAN IS MOUNTED ON VENTILATOR MOTOR SHAFT, FAN IS BROUGHT INTO CONTACT WITH THE CASE TO CAUSE A SCRATCH | WHEN MOUNTING FAN TO THE VENTILATOR MOTOR SHAFT, LIMIT THE FAN MOVEMENT PATH TO PREVENT CONTACT WITH THE CASE | FAN | ROTATIONAL | AESTHETIC SURFACE |
| | DIFFICULT TO VIEW TAPPING LOWER HOLE FOR FIXING VENTILATOR MOTOR MOUNTING BRACKET | REARRANGE THE CONNECTION PORTION OF THE VENTILATOR MOTOR MOUNTING BRACKET FIXING SCREW IN A VISIBLE REGION | MOUNTING BRACKET | SCREW ROTATION | HIDDEN |
| VTR | VTR GUIDE ROLLER GUIDING BRACKET HAS A COMPLICATED SHAPE AND IT IS DIFFICULT TO ASSEMBLE IT | MAKE THE VTR GUIDE ROLLER GUIDING BRACKET FROM RESIN AND OUTSERT-MOLD IT AS A UNITARY BLOCK WITH CASE | GUIDE BRACKET | | |
| | ROTATE THE VTR GUIDE PIN TO INSERT IT INTO THE POSITIONING HOLE WITH PRESSURE | NARROW THE ENGAGEMENT TIP END OF THE VTR GUIDE PIN AND ASSEMBLE IT BY RECTILINEAR MOVEMENT | GUIDE PIN | ROTATIONAL | |
| | DEFORM VTR LOADING MOTOR WIRING | CONNECT THE VTR LOADING MOTOR DIRECTLY ONTO THE MOTOR CONTROL SUBSTRATE | MOTOR | DEFORMING | |
| | ASSEMBLE VTR FRONT PANEL BEFORE ASSEMBLING CASE COVER | ASSEMBLE VTR CASE COVER FIRSTLY AND ASSEMBLE LATER THE FRONT PANEL WHICH IS EASILY SCRATCHED | FRONT PANEL | ROTATIONAL | AESTHETIC SURFACE |
| | DIFFICULT TO VIEW THE ENGAGEMENT PORTION OF THE CLICK FOR PREVENTING REMOVAL OF THE VTR LOADING ARM | REARRANGE THE CONNECTION PORTION OF THE VTR LOADING ARM IN A VISIBLE REGION | ARM | SCREW ROTATION | HIDDEN |
| MOTOR-DRIVEN DEVICE | SUPPORT THE PART PREVENTING REMOVAL OF THE MOTOR-DRIVEN DEVICE FROM INSIDE THE CASE AND INSERT SWITCHING LEVER FROM OUTSIDE WITH PRESSURE | MOLD ENGAGEMENT CLICK AS A UNITARY BLOCK WITH THE SWITCHING LEVER OF THE MOTOR-DRIVEN DEVICE AND ASSEMBLE IT BY SNAP FIT | SWITCHING LEVER | | |
| | ROTATE MOTOR-DRIVEN DEVICE SWITCHING LEVER AND ASSEMBLE IT TO CASE | NARROW THE ENGAGEMENT CLICK TIP END OF THE SWITCHING LEVER OF THE MOTOR-DRIVEN DEVICE AND ASSEMBLE IT BY RECTILINEAR MOVEMENT | SWITCHING LEVER | ROTATIONAL | |
| | DEFORM ENGAGEMENT CLICK OF MOTOR-DRIVEN DEVICE SWITCHING LEVER INWARD | TAPER THE CASE UPPER OPENING PORTION OF THE SWITCHING LEVER OF THE MOTOR-DRIVEN DEVICE | SWITCHING LEVER | DEFORMING | |
| | WHEN SWITCHING LEVER IS MOUNTED ON MOTOR-DRIVEN DEVICE CASE, IT IS BROUGHT INTO CONTACT WITH THE CASE TO CAUSE A SCRATCH | MAKE THE MOTOR-DRIVEN DEVICE CASE SURFACE STRENGTH HIGHER THAN THE SWITCHING LEVER | SWITCHING LEVER | ROTATIONAL | AESTHETIC SURFACE |
| | DIFFICULT TO VIEW CONNECTION PORTION BETWEEN THE ENGAGEMENT CLICK OF THE MOTOR-DRIVEN DEVICE SWITCHING LEVER AND THE CASE | REARRANGE THE CONNECTION PORTION BETWEEN THE MOTOR-DRIVEN DEVICE SWITCHING LEVER ENGAGEMENT CLICK AND THE CASE IN A VISIBLE REGION | SWITCHING LEVER | SCREW ROTATION | HIDDEN |

FIG. 6B

| CLASSIFICATION | | ASSEMBLING TIME/DEFECTIVE ASSEMBLY IMPROVEMENT EXAMPLE IN THE PAST | | IMPROVEMENT GUIDELINE | |
|---|---|---|---|---|---|
| TARGET ELEMENT | IMPROVEMENT KEYWORD | ASSEMBLING METHOD BEFORE IMPROVEMENT | IMPROVEMENT EXAMPLE | GENERALIZED IMPROVEMENT GUIDELINE | CONCRETE IMPROVEMENT MEASURE |
| PART | DIVIDE | VENTILATOR FAN GOT CAUGHT IN THE STRING OF OPEN/CLOSE SWITCH | DIVIDE VENTILATOR OPEN/CLOSE SWITCH INTO A SWITCH BODY AND A STRING, ASSEMBLE THE SWITCH BODY FIRSTLY AND ASSEMBLE THE STRING LASTLY | DIVIDE THE PART TO BE ASSEMBLED AND CHANGE THE ASSEMBLING ORDER | ASSEMBLE LASTLY THE PART WHICH IS DIFFICULT TO BE ASSEMBLED |
| PART | UNIFY | VTR GUIDE ROLLER GUIDING BRACKET HAS A COMPLICATED SHAPE AND IT IS DIFFICULT TO ASSEMBLE IT | MAKE THE VTR GUIDE ROLLER GUIDING BRACKET FROM RESIN AND OUTSERT-MOLD IT AS A UNITARY BLOCK WITH CASE | UNIFY WITH OTHER PART | OUTSERT MOLDING |
| PART | UNIFY | SUPPORT THE PART PREVENTING REMOVAL OF THE MOTOR-DRIVEN DEVICE FROM INSIDE THE CASE AND CLINCH SWITCHING LEVER FROM OUTSIDE | MOLD ENGAGEMENT CLICK AS A UNITARY BLOCK WITH THE SWITCHING LEVER OF THE MOTOR-DRIVEN DEVICE AND ASSEMBLE IT BY SNAP FIT | | USE ELASTICITY OF THE MEMBER |
| ROTATIONAL | RECTILINEAR MOVEMENT | ROTATE VENTILATOR MOTOR AND PLACE IT AT POSITIONING BRACKET | WIDEN THE TIP END OF THE VENTILATOR MOTOR POSITIONING BRACKET AND ASSEMBLE IT BY RECTILINEAR MOVEMENT | ASSEMBLE BY RECTILINEAR MOVEMENT | WIDEN THE ENGAGEMENT PORTION TIP END |
| ROTATIONAL | RECTILINEAR MOVEMENT | ROTATE VTR GUIDE PIN AND INSERT IT INTO THE POSITIONING HOLE WITH PRESSURE | NARROW THE ENGAGEMENT TIP END OF THE VTR GUIDE PIN AND ASSEMBLE IT BY RECTILINEAR MOVEMENT | | NARROW THE ENGAGEMENT PORTION TIP END |
| ROTATIONAL | RECTILINEAR MOVEMENT | ROTATE SWITCHING LEVER OF MOTOR-DRIVEN DEVICE AND ASSEMBLE IT TO CASE | NARROW THE ENGAGEMENT CLICK TIP END OF THE SWITCHING LEVER OF THE MOTOR-DRIVEN DEVICE AND ASSEMBLE IT BY RECTILINEAR MOVEMENT | | NARROW THE ENGAGEMENT PORTION TIP END |
| DEFORMING | DIRECT CONNECTION | DEFORM VENTILATOR MOTOR WIRING | CONNECT VENTILATOR MOTOR DIRECTLY ONTO THE MOTOR CONTROL SUBSTRATE | ELIMINATE NEED OF DEFORMING | DIRECT MOUNTING ON SUBSTRATE |
| DEFORMING | DIRECT CONNECTION | DEFORM VTR LOADING MOTOR WIRING | CONNECT VTR LOADING MOTOR DIRECTLY ONTO THE MOTOR CONTROL SUBSTRATE | | DIRECT MOUNTING ON SUBSTRATE |
| DEFORMING | TAPER | DEFORM ENGAGEMENT CLICK OF MOTOR-DRIVEN DEVICE SWITCHING LEVER INWARD | TAPER THE UPPER OPENING OF THE SWITCHING LEVER OF THE MOTOR-DRIVEN DEVICE | USE PART TO BE ASSEMBLED AS A JIG | TAPER ENGAGEMENT PORTION |
| AESTHETIC SURFACE | MOVEMENT PATH | WHEN FAN IS MOUNTED ON THE VENTILATOR MOTOR SHAFT, THE FAN WAS BROUGHT INTO CONTACT WITH THE CASE TO CAUSE A SCRATCH | WHEN MOUNTING FAN TO THE VENTILATOR MOTOR SHAFT, LIMIT THE FAN MOVEMENT PATH TO PREVENT CONTACT WITH THE CASE | MODIFY MOVEMENT ROUTE ABOVE THE AESTHETIC SURFACE | |
| AESTHETIC SURFACE | ASSEMBLE LATER | ASSEMBLE VTR FRONT PANEL AND THEN ASSEMBLE VTR CASE COVER | ASSEMBLE VTR CASE COVER FIRSTLY AND THEN ASSEMBLE FRONT PANEL WHICH IS EASILY SCRATCHED | CHANGE THE ASSEMBLING ORDER OF THE AESTHETIC PART | |
| AESTHETIC SURFACE | SURFACE STRENGTH | WHEN MOUNTING SWITCHING LEVER ON THE MOTOR-DRIVEN DEVICE, IT WAS BROUGHT INTO CONTACT WITH THE CASE TO SCRATCH IT | MAKE THE MOTOR-DRIVEN DEVICE CASE SURFACE STRENGTH HIGHER THAN THE SWITCHING LEVER | INCREASE THE RELATIVE STRENGTH OF THE AESTHETIC SURFACE | |
| HIDDEN | VISIBLE REGION | DIFFICULT TO VIEW THE TAPPING LOWER HOLE FOR FIXING THE VENTILATOR MOTOR MOUNTING BRACKET | REARRANGE THE CONNECTION PORTION OF THE VENTILATOR MOTOR MOUNTING BRACKET FIXING SCREW IN A VISIBLE REGION | REARRANGE THE CONNECTION PORTION IN A VISIBLE RANGE | |
| HIDDEN | VISIBLE REGION | DIFFICULT TO VIEW THE ENGAGEMENT PORTION OF THE CLICK FOR PREVENTING REMOVAL OF THE VTR LOADING ARM | REARRANGE THE CONNECTION PORTION OF THE VTR LOADING ARM IN A VISIBLE REGION | | |
| HIDDEN | VISIBLE REGION | DIFFICULT TO VIEW THE CONNECTION PORTION BETWEEN THE MOTOR-DRIVEN DEVICE SWITCHING LEVER ENGAGEMENT CLICK AND THE CASE | REARRANGE THE CONNECTION PORTION BETWEEN THE MOTOR-DRIVEN DEVICE SWITCHING LEVER ENGAGEMENT CLICK AND THE CASE IN A VISIBLE REGION | | |

FIG. 6C

| TARGET ELEMENT | IMPROVEMENT KEYWORD |
|---|---|
| PART | DIVIDE |
| | UNIFY |
| ROTATIONAL | RECTILINEAR MOVEMENT |
| DEFORMING | DIRECTION CONNECTION |
| | TAPER |
| AESTHETIC SURFACE | MOVEMENT ROUTE |
| | ASSEMBLE LATER |
| | SURFACE STRENGTH |
| HIDDEN | VISIBLE REGION |

FIG. 6D

| CLASSIFICATION | | IMPROVEMENT GUIDELINE | |
|---|---|---|---|
| TARGET ELEMENT | | GENERALIZED IMPROVEMENT GUIDELINE | CONCRETE IMPROVEMENT MEASURE |
| PART | | DIVIDE PART TO BE ASSEMBLED AND CHANGE ASSEMBLING ORDER | ASSEMBLE LASTLY THE PART WHICH IS DIFFICULT TO BE ASSEMBLED |
| | | UNIFY WITH OTHER PART | OUTSERT MOLDING |
| | | | USE OF ELASTICITY OF THE MEMBER |
| ROTATIONAL | | ASSEMBLE BY RECTILINEAR MOVEMENT | WIDEN THE ENGAGEMENT PORTION TIP END |
| | | | NARROW THE ENGAGEMENT PORTION TIP END |
| DEFORMING | | ELIMINATE NEED OF SHAPING DEFORMING | DIRECT MOUNTING ON THE SUBSTRATE |
| | | USE PART TO BE ASSEMBLED AS A JIG | TAPER ENGAGEMENT PORTION |
| AESTHETIC SURFACE | | MODIFY MOVEMENT ROUTE ABOVE THE AESTHETIC SURFACE | |
| | | CHANGE THE ASSEMBLING ORDER OF THE AESTHETIC PART | |
| | | INCREASE RELATIVE STRENGTH OF THE AESTHETIC SURFACE | |
| HIDDEN | | REARRANGE THE CONNECTION PORTION IN A VISIBLE REGION | |

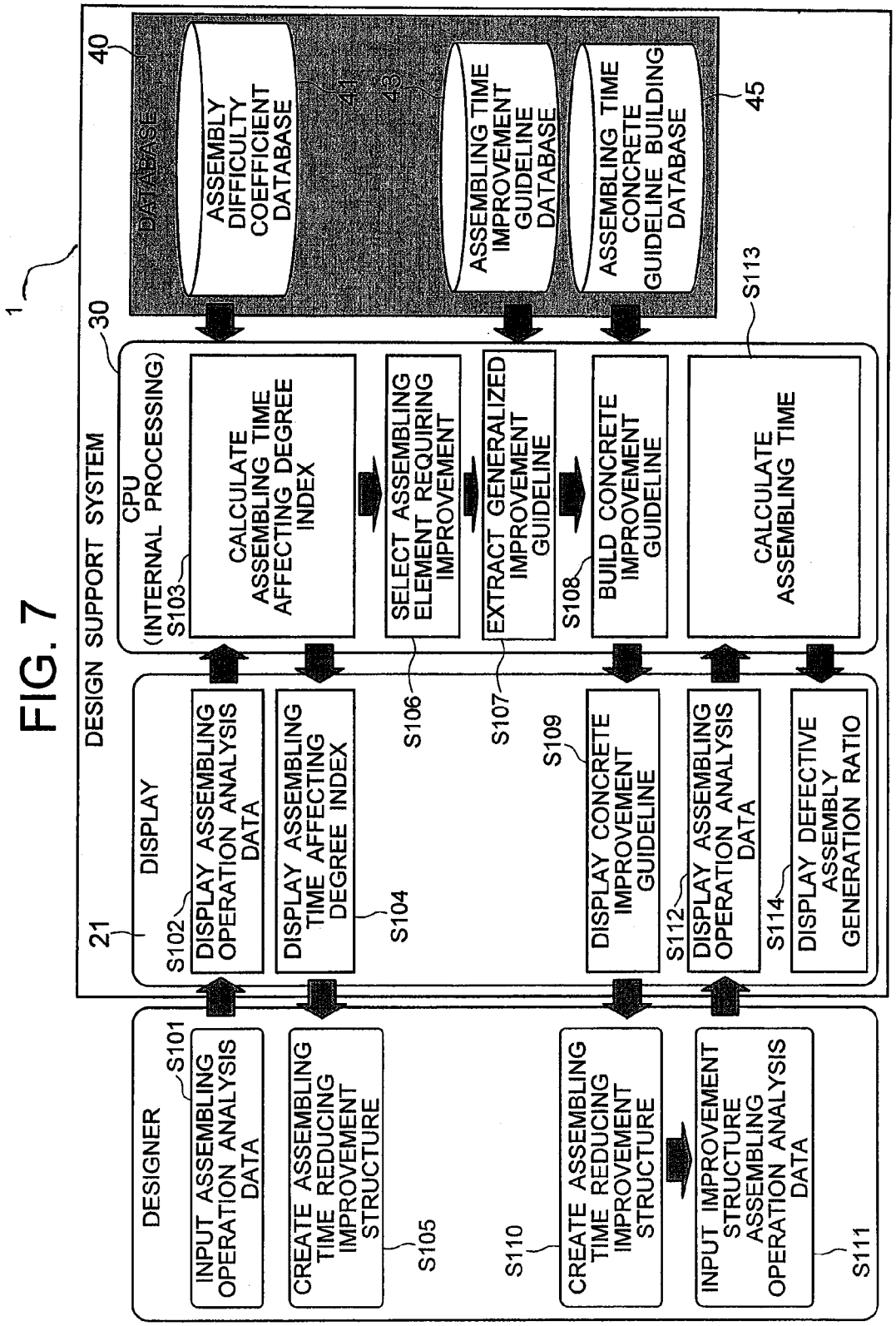

FIG. 8

| No | PART NAME | n | ASSEMBLING OPERATION NAME | n | ATTRIBUTE NAME | n | ASSEMBLING TIME AFFECTING DEGREE INDEX | IMPROVEMENT REQUIRED OR NOT |
|---|---|---|---|---|---|---|---|---|
| 1 | CASE | 1 | — | | — | | 11 | |
| 2 | SWITCHING LEVER | 1 | — | | — | | 89 | ◎ |
| 3 | (CASE) | 1 | DOWNWARD | 1 | — | | 11 | |
| 4 | (SWITCHING LEVER) | 1 | DOWNWARD | 1 | — | | 11 | |
| 5 | (SWITCHING LEVER) | 1 | DEFORMING | 2 | — | | 38 | ◎ |
| 6 | (SWITCHING LEVER) | 1 | ROTATIONAL | 1 | — | | 29 | ◎ |
| 7 | (SWITCHING LEVER) | 1 | CLINCHING | 1 | — | | 12 | |
| 8 | (SWITCHING LEVER) | 1 | (DOWNWARD) | 1 | AESTHETIC SURFACE | 1 | 0 | |
| 9 | (SWITCHING LEVER) | 1 | (ROTATIONAL) | 1 | AESTHETIC SURFACE | 1 | 0 | |
| 10 | (SWITCHING LEVER) | 1 | (ROTATIONAL) | 1 | HIDDEN | 1 | 0 | |
| 11 | (SWITCHING LEVER) | 1 | (CLINCHING) | 1 | MULTIPLE HOLES | 1 | 4 | |

FIG. 9

| ASSEMBLING ELEMENT REQUIRING IMPROVEMENT | PART | 1 SWITCHING LEVER | 2 (SWITCHING LEVER) | 3 (SWITCHING LEVER) |
|---|---|---|---|---|
| | OPERATION | — | DEFORMING | ROTATIONAL |
| | ATTRIBUTE | — | — | — |
| | INDEX | 89 | 38 | 29 |
| CONCRETE IMPROVEMENT GUIDELINE | 1 | IMPROVEMENT GUIDELINE (ELEMENT 1) IN ORDER TO REDUCE THE ASSEMBLING TIME OF THE SWITCHING LEVER, DIVIDE THE PART TO BE ASSEMBLED AND CHANGE THE ASSEMBLING ORDER. 1) ASSEMBLE LASTLY THE PART WHICH IS ASSEMBLED WITH DIFFICULTY | IMPROVEMENT GUIDELINE (ELEMENT 2) IN ORDER TO REDUCE THE OPERATION TIME REQUIRED FOR DEFORMING THE SWITCHING LEVER, THE NEED OF DEFORMING OF THE SWITCHING LEVER IS ELIMINATED. 1) DIRECT MOUNTING ON THE SUBSTRATE | IMPROVEMENT GUIDELINE (ELEMENT 3) IN ORDER TO REDUCE THE OPERATION TIME REQUIRED FOR ROTATIONAL OF THE SWITCHING LEVER, ASSEMBLE THE SWITCHING LEVER BY RECTILINEAR MOVEMENT 1) WIDEN THE ENGAGEMENT PORTION TIP END, 2) NARROW THE ENGAGEMENT PORTION TIP END |
| | 2 | IN ORDER TO REDUCE THE ASSEMBLING TIME OF THE SWITCHING LEVER, UNIFY IT WITH OTHER PART 1) OUTSERT MOLDING, 2) USE OF ELASTICITY OF THE MEMBER | IN ORDER TO REDUCE THE OPERATION TIME REQUIRED FOR DEFORMING THE SWITCHING LEVER, USE THE PART TO BE ASSEMBLED AS A JIG. 1) TAPER THE ENGAGEMENT PORTION | |

| No | IMPROVEMENT GUIDELINE | IMPROVEMENT STRUCTURE PLAN | ANALYSIS OF ASSEMBLING OPERATIONS IN THE IMPROVEMENT STRUCTURE PLAN ||||||
|---|---|---|---|---|---|---|---|---|
| | | | PART ||ASSEMBLING OPERATION ||ATTRIBUTE ||
| | | | NAME | n | NAME | n | NAME | n |
| 1-1 | IN ORDER TO REDUCE THE ASSEMBLING TIME OF THE SWITCHING LEVER, DIVIDE THE PART TO BE ASSEMBLED AND CHANGE THE ASSEMBLING ORDER. 1) ASSEMBLE LASTLY THE PART WHICH IS ASSEMBLED WITH DIFFICULTY | DIVIDE THE CASE INTO AN UPPER AND A LOWER PORTION AND CHANGE THE ASSEMBLING ORDER INTO THE CASE LOWER PORTION, THE SWITCHING LEVER, AND THE CASE UPPER PORTION | CASE LOWER PORTION | 1 | DOWNWARD | 1 | | |
| | | | SWITCHING LEVER | 1 | DOWNWARD | 1 | AESTHETIC SURFACE | 1 |
| | | | CASE LOWER PORTION | 1 | DOWNWARD | 1 | | |
| 1-2 | IN ORDER TO REDUCE THE ASSEMBLING TIME OF THE SWITCHING LEVER, UNIFY IT WITH OTHER PART 1) OUTSERT MOLDING, 2) USE OF ELASTICITY OF THE MEMBER | MOLD THE SWITCHING LEVER AS A UNITARY BLOCK WITH THE CASE | | | | | | |
| 3-1 | IN ORDER TO REDUCE THE OPERATION TIME REQUIRED FOR ROTATING THE SWITCHING LEVER, ASSEMBLE THE SWITCHING LEVER BY RECTILINEAR MOVEMENT 1) WIDEN THE ENGAGEMENT PORTION TIP END, 2) NARROW THE ENGAGEMENT PORTION TIP END | NARROW THE TIP END OF THE SWITCHING LEVER AND ASSEMBLE IT BY RECTILINEAR MOVEMENT | CASE | 1 | DOWNWARD | 1 | AESTHETIC SURFACE | 1 |
| | | | SWITCHING LEVER | 1 | DOWNWARD | 1 | MULTIPLE HOLES | 1 |
| | | | | | CLINCHING | 1 | | |

FIG. 10B

| RANKING | No | IMPROVEMENT STRUCTURE PLAN | IMPROVEMENT EFFECT |
|---|---|---|---|
| | | BEFORE IMPROVEMENT | 100% |
| 1 | 1-2 | MOLD SWITCHING LEVER AS A UNITARY BLOCK WITH THE CASE | 0% |
| 2 | 3-1 | NARROW THE TIP END OF THE SWITCHING LEVER AND ASSEMBLE IT BY RECTILINEAR MOVEMENT | 48% |
| 3 | 1-1 | DIVIDE THE CASE INTO AN UPPER AND A LOWER PORTION AND CHANGE THE ASSEMBLING ORDER INTO THE CASE LOWER PORTION, THE SWITCHING LEVER, AND THE CASE UPPER PORTION | 51% |

FIG. 12

| No | PART | | ASSEMBLING OPERATION | | ATTRIBUTE | | OPERATION TIME |
|---|---|---|---|---|---|---|---|
| | NAME | QUANTITY | NAME | REPETITION QUANTITY | NAME | REPETITION QUANTITY | |
| 1 | CASE | 1 | DOWNWARD | 1 | | | $u_{Downward}$ 1 |
| 2 | SWITCHING LEVER | 1 | DOWNWARD | 1 | AESTHETIC SURFACE | 1 | $u_{Downward\ Aesthetic\ surface}$ 1 |
| 3 | | | DEFORMING | 2 | | | $u_{Deforming}$ 1 |
| 4 | | | ROTATIONAL | 1 | AESTHETIC SURFACE | 1 | $u_{Rotational\ Aesthetic\ surface\ Hidden}$ 1 |
| 5 | | | | | HIDDEN | 1 | |
| 6 | | | CLINCHING | | MULTIPLE HOLES | 1 | $u_{Clinching\ Multiple\ holes}$ 31 |

| PART | ASSEMBLING OPERATION | ATTRIBUTE 1 | ATTRIBUTE 2 | ASSEMBLING TIME | ASSEMBLY DIFFICULTY COEFFICIENT CALCULATION EXAMPLE |
|---|---|---|---|---|---|
| CASE | DOWNWARD | | | $u_{Downward\ 1}$ | $u_{Downward\ 0} = (u_{Downward\ 1} + u_{Downward\ 2} + u_{Downward\ 3})/3$ |
| PART 1 | DOWNWARD | | | $u_{Downward\ 2}$ | $\gamma_{Downward} = 1$ |
| PART 2 | DOWNWARD | | | $u_{Downward\ 3}$ | |
| SWITCHING LEVER | DEFORMING | | | $u_{Deforming\ 1}$ | |
| PART 3 | DEFORMING | | | $u_{Deforming\ 2}$ | $\gamma_{Deforming} = ((u_{Deforming\ 1} + u_{Deforming\ 2} + u_{Deforming\ 3})/3)/u_{Downward\ 0}$ |
| PART 4 | DEFORMING | | | $u_{Deforming\ 3}$ | |
| PART 5 | ROTATIONAL | | | $u_{Rotational\ 1}$ | |
| PART 6 | ROTATIONAL | | | $u_{Rotational\ 2}$ | $\gamma_{Rotational} = ((u_{Rotational\ 1} + u_{Rotational\ 2} + u_{Rotational\ 3})/3)/u_{Downward\ 0}$ |
| PART 7 | ROTATIONAL | | | $u_{Rotational\ 3}$ | |
| PART 8 | CLINCHING | | | $u_{Clinching\ 1}$ | |
| PART 9 | CLINCHING | | | $u_{Clinching\ 2}$ | $\gamma_{Clinching} = ((u_{Clinching\ 1} + u_{Clinching\ 2} + u_{Clinching\ 3})/3)/u_{Downward\ 0}$ |
| PART 10 | CLINCHING | | | $u_{Clinching\ 3}$ | |
| SWITCHING LEVER | DOWNWARD | AESTHETIC SURFACE | | $u_{Downward\ Aesthetic\ surface\ 1}$ | |
| PART 11 | ROTATIONAL | AESTHETIC SURFACE | | $u_{Rotational\ Aesthetic\ surface\ 2}$ | $\theta_{Aesthetic\ surface} = (u_{Downward\ Aesthetic\ surface\ 1} / u_{Downward\ 0} + u_{Rotational\ Aesthetic\ surface\ 2} / u_{Rotational\ 0})/3$ |
| | ROTATIONAL | AESTHETIC SURFACE | HIDDEN | $u_{Rotational\ Aesthetic\ surface\ Hidden\ 1}$ | |
| PART 12 | DOWNWARD | | HIDDEN | $u_{Downward\ Hidden\ 1}$ | |
| PART 13 | ROTATIONAL | | HIDDEN | $u_{Rotational\ Hidden\ 1}$ | $\theta_{Hidden} = (u_{Downward\ Hidden\ 1} / u_{Downward\ 0} + u_{Rotational\ Hidden\ 1} / u_{Rotational\ 0} + u_{Rotational\ Aesthetic\ surface\ Hidden\ 1} / u_{Rotational\ Aesthetic\ surface\ 2})/3$ |
| SWITCHING LEVER | CLINCHING | MULTIPLE HOLES | | $u_{Clinching\ Multiple\ holes\ 31}$ | |
| PART 14 | CLINCHING | MULTIPLE HOLES | | $u_{Clinching\ Multiple\ holes\ 32}$ | $\theta_{Multiple\ holes\ 3} = ((u_{Clinching\ Multiple\ holes\ 31} + u_{Clinching\ Multiple\ holes\ 32} + u_{Clinching\ Multiple\ holes\ 33})/u_{Clinching\ 0})/3$ |
| PART 15 | CLINCHING | MULTIPLE HOLES | | $u_{Clinching\ Multiple\ holes\ 33}$ | |

FIG. 15

| No | PART NAME | n | ASSEMBLING OPERATION NAME | n | ATTRIBUTE NAME | n | DEFECTIVE ASSEMBLY AFFECTING DEGREE INDEX | IMPROVEMENT REQUIRED OR NOT |
|---|---|---|---|---|---|---|---|---|
| 1 | CASE | 1 | — | | — | | 1 | |
| 2 | SWITCHING LEVER | 1 | — | | — | | 99 | ◎ |
| 3 | (CASE) | 1 | DOWNWARD | 1 | — | | 1 | |
| 4 | (SWITCHING LEVER) | 1 | DOWNWARD | 1 | — | | 3 | |
| 5 | (SWITCHING LEVER) | 1 | DEFORMING | 1 | — | | 24 | |
| 6 | (SWITCHING LEVER) | 1 | ROTATIONAL | 1 | — | | 57 | ◎ |
| 7 | (SWITCHING LEVER) | 1 | CLINCHING | 1 | — | | 14 | |
| 8 | (SWITCHING LEVER) | 1 | (DOWNWARD) | 1 | AESTHETIC SURFACE | 1 | 1 | |
| 9 | (SWITCHING LEVER) | 1 | (ROTATIONAL) | 1 | AESTHETIC SURFACE | 1 | 29 | |
| 10 | (SWITCHING LEVER) | 1 | (ROTATIONAL) | 1 | HIDDEN | 1 | 46 | ◎ |
| 11 | (SWITCHING LEVER) | 1 | (CLINCHING) | 1 | MULTIPLE HOLES | 1 | 4 | |

FIG. 16

| ASSEMBLING ELEMENT REQUIRING IMPROVEMENT | | 1 | 2 | 3 |
|---|---|---|---|---|
| | PART | SWITCHING LEVER | (SWITCHING LEVER) | (SWITCHING LEVER) |
| | OPERATION | — | ROTATIONAL | (ROTATIONAL) |
| | ATTRIBUTE | — | — | HIDDEN |
| | INDEX | 99 | 57 | 46 |
| CONCRETE IMPROVEMENT GUIDELINE | 1 | IMPROVEMENT GUIDELINE (ELEMENT 1)<br><br>IN ORDER TO REDUCE THE DEFECTIVE ASSEMBLY OF THE SWITCHING LEVER, DIVIDE THE PART TO BE ASSEMBLED AND CHANGE THE ASSEMBLING ORDER, 1) ASSEMBLE LASTLY THE PART WHICH IS ASSEMBLED WITH DIFFICULTY | IMPROVEMENT GUIDELINE (ELEMENT 2)<br><br>IN ORDER TO REDUCE THE DEFECTIVE ASSEMBLY IN ROTATIONAL OPERATION TIME OF THE SWITCHING LEVER, ASSEMBLE THE SWITCHING LEVER BY RECTILINEAR MOVEMENT 1) WIDEN THE ENGAGEMENT TIP END, 2) NARROW THE ENGAGEMENT TIP END | IMPROVEMENT GUIDELINE (ELEMENT 3)<br><br>IN ORDER TO REDUCE THE DEFECTIVE ASSEMBLY IN ROTATIONAL OPERATION ACCOMPANIED BY THE ATTRIBUTE OF DIFFICULTY TO VIEW THE CONNECTION PORTION OF THE SWITCHING LEVER, REARRANGE THE CONNECTION PORTION OF THE SWITCHING LEVER IN A VISIBLE REGION |
| | 2 | IN ORDER TO REDUCE THE DEFECTIVE ASSEMBLY OF THE SWITCHING LEVER, UNIFY IT WITH OTHER PART 1) OUTSERT MOLDING, 2) USE OF ELASTICITY OF THE MEMBER | | |

FIG. 17A

| No | IMPROVEMENT GUIDELINE | IMPROVEMENT STRUCTURE PLAN | ANALYSIS OF ASSEMBLING OPERATIONS IN THE IMPROVEMENT STRUCTURE PLAN ||||||
|---|---|---|---|---|---|---|---|---|
| | | | PART || ASSEMBLING OPERATION || ATTRIBUTE ||
| | | | NAME | n | NAME | n | NAME | n |
| 1-1 | IN ORDER TO REDUCE THE DEFECTIVE ASSEMBLY OF THE SWITCHING LEVER, DIVIDE THE PART TO BE ASSEMBLED AND CHANGE THE ASSEMBLING ORDER, 1) ASSEMBLE LASTLY THE PART WHICH IS ASSEMBLED WITH DIFFICULTY | DIVIDE THE CASE INTO AN UPPER AND A LOWER PORTION AND CHANGE THE ASSEMBLING ORDER INTO THE CASE LOWER PORTION, THE SWITCHING LEVER, AND THE CASE UPPER PORTION | CASE LOWER PORTION | 1 | DOWNWARD | 1 | | |
| | | | SWITCHING LEVER | 1 | DOWNWARD | 1 | AESTHETIC SURFACE | 1 |
| | | | CASE LOWER PORTION | 1 | DOWNWARD | 1 | | |
| 1-2 | IN ORDER TO REDUCE THE DEFECTIVE ASSEMBLY OF THE SWITCHING LEVER IN THE ROTATION OPERATION, ASSEMBLE THE SWITCHING LEVER BY RECTILINEAR MOVEMENT 1) WIDEN THE ENGAGEMENT PORTION TIP END, 2) NARROW THE ENGAGEMENT PORTION TIP END | NARROW THE SWITCHING LEVER TIP END AND ASSEMBLE IT BY RECTILINEAR MOVEMENT | CASE | 1 | DOWNWARD | 1 | | |
| | | | SWITCHING LEVER | 1 | DOWNWARD | 1 | AESTHETIC SURFACE | 1 |
| | | | | | CLINCHING | 1 | MULTIPLE HOLES | 1 |
| 3-1 | IN ORDER TO REDUCE THE DEFECTIVE ASSEMBLY IN THE ROTATION OPERATION ACCOMPANIED BY THE ATTRIBUTE OF HIDDEN OF THE SWITCHING LEVER, REARRANGE THE CONNECTION PORTION OF THE SWITCHING LEVER IN A VISIBLE REGION | EXTEND THE TIP END OF THE SWITCHING END AND REARRANGE THE CONNECTION PORTION IN A VISIBLE REGION | CASE | 1 | DOWNWARD | 1 | | |
| | | | SWITCHING LEVER | 1 | DOWNWARD | 1 | AESTHETIC SURFACE | 1 |
| | | | | | DEFORMING | 2 | | |
| | | | | | ROTATIONAL | 1 | AESTHETIC SURFACE | 1 |
| | | | | | CLINCHING | 1 | | |

FIG. 17B

| RANKING | No | IMPROVEMENT STRUCTURE PLAN | IMPROVEMENT EFFECT |
|---|---|---|---|
| | | BEFORE IMPROVEMENT | 100% |
| 1 | 1-1 | DIVIDE THE CASE INTO AN UPPER AND A LOWER PORTION AND CHANGE THE ASSEMBLING ORDER INTO THE CASE LOWER PORTION, THE SWITCHING LEVER, AND THE CASE UPPER PORTION | 7% |
| 2 | 1-2 | NARROW THE TIP END OF THE SWITCHING LEVER AND ASSEMBLE IT BY RECTILINEAR MOVEMENT | 7% |
| 3 | 3-1 | EXTEND THE TIP END OF THE SWITCHING LEVER AND REARRANGE THE CONNECTION PORTION IN A VISIBLE REGION | 48% |

FIG. 19

| No | PART NAME | n | ASSEMBLING OPERATION NAME | n | ATTRIBUTE NAME | n | OVERALL ASSEMBLING COST AFFECTING DEGREE INDEX | IMPROVEMENT REQUIRED OR NOT |
|---|---|---|---|---|---|---|---|---|
| 1 | CASE | 1 | — | | — | | 8 | |
| 2 | SWITCHING LEVER | 1 | — | | — | | 92 | ◎ |
| 3 | (CASE) | 1 | DOWNWARD | 1 | — | | 8 | |
| 4 | (SWITCHING LEVER) | 1 | DOWNWARD | 1 | — | | 9 | |
| 5 | (SWITCHING LEVER) | 1 | DEFORMING | 2 | — | | 34 | ◎ |
| 6 | (SWITCHING LEVER) | 1 | ROTATIONAL | 1 | — | | 37 | ◎ |
| 7 | (SWITCHING LEVER) | 1 | CLINCHING | 1 | — | | 13 | |
| 8 | (SWITCHING LEVER) | 1 | (DOWNWARD) | 1 | AESTHETIC SURFACE | 1 | 1 | |
| 9 | (SWITCHING LEVER) | 1 | (ROTATIONAL) | 1 | AESTHETIC SURFACE | 1 | 9 | |
| 10 | (SWITCHING LEVER) | 1 | (ROTATIONAL) | 1 | HIDDEN | 1 | 14 | |
| 11 | (SWITCHING LEVER) | 1 | (CLINCHING) | 1 | MULTIPLE HOLES | 1 | 4 | |

FIG. 20

| ASSEMBLING ELEMENT REQUIRING IMPROVEMENT | | 1 | 2 | 3 |
|---|---|---|---|---|
| | PART | SWITCHING LEVER | (SWITCHING LEVER) | (SWITCHING LEVER) |
| | OPERATION | — | DEFORMING | ROTATIONAL |
| | ATTRIBUTE | — | — | — |
| | INDEX | 89 | 38 | 29 |
| CONCRETE IMPROVEMENT GUIDELINE | | IMPROVEMENT GUIDELINE (ELEMENT 1) | IMPROVEMENT GUIDELINE (ELEMENT 2) | IMPROVEMENT GUIDELINE (ELEMENT 3) |
| | 1 | IN ORDER TO REDUCE THE OVERALL ASSEMBLING COST OF THE SWITCHING LEVER, DIVIDE THE PART TO BE ASSEMBLED AND CHANGE THE ASSEMBLING ORDER, 1) ASSEMBLE LASTLY THE PART WHICH IS ASSEMBLED WITH DIFFICULTY | IN ORDER TO REDUCE THE OVERALL ASSEMBLING COST OF THE SWITCHING LEVER IN DEFORMING OPERATION, ELIMINATE THE NEED OF DEFORMING OPERATION OF THE SWITCHING LEVER 1) MOUNT DIRECTLY ON THE SUBSTRATE | IN ORDER TO REDUCE THE OVERALL ASSEMBLING COST OF THE SWITCHING LEVER IN ROTATIONAL OPERATION, ASSEMBLE THE SWITCHING LEVER BY RECTILINEAR MOVEMENT 1) WIDEN THE TIP END OF THE ENGAGEMENT PORTION, 2) NARROW THE TIP END OF THE ENGAGEMENT PORTION |
| | 2 | IN ORDER TO REDUCE THE OVERALL ASSEMBLING COST OF THE SWITCHING LEVER, UNIFY IT WITH OTHER PART 1) OUTSERT MOLDING, 2) USE OF ELASTICITY OF THE MEMBER | IN ORDER TO REDUCE THE OVERALL ASSEMBLING COST OF THE SWITCHING LEVER IN DEFORMING OPERATION, USE THE PART TO BE ASSEMBLED AS A JIG 1) TAPER THE ENGAGEMENT PORTION | |

FIG. 21A

| No | IMPROVEMENT GUIDELINE | IMPROVEMENT STRUCTURE PLAN | ANALYSIS OF ASSEMBLING OPERATIONS IN THE IMPROVEMENT STRUCTURE PLAN ||||||
|---|---|---|---|---|---|---|---|---|
| | | | PART || ASSEMBLING OPERATION || ATTRIBUTE ||
| | | | NAME | n | NAME | n | NAME | n |
| 1-1 | IN ORDER TO REDUCE THE OVERALL ASSEMBLING COST OF THE SWITCHING LEVER, DIVIDE THE PART TO BE ASSEMBLED AND CHANGE THE ASSEMBLING ORDER. 1) ASSEMBLE LASTLY THE PART WHICH IS ASSEMBLED WITH DIFFICULTY | DIVIDE THE CASE INTO AN UPPER AND A LOWER PORTION AND CHANGE THE ASSEMBLING ORDER. INTO THE CASE LOWER PORTION, THE SWITCHING LEVER, AND THE CASE UPPER PORTION (511a, 511, 521) | CASE LOWER PORTION | 1 | DOWNWARD | 1 | | |
| | | | SWITCHING LEVER | 1 | DOWNWARD | 1 | AESTHETIC SURFACE | 1 |
| | | | CASE LOWER PORTION | 1 | DOWNWARD | 1 | | |
| 1-2 | IN ORDER TO REDUCE THE OVERALL ASSEMBLING COST OF THE SWITCHING LEVER, UNITY WITH OTHER PART 1) OUTSERT MOLDING, 2) USE OF ELASTICITY OF THE MEMBER | MOLD THE SWITCHING LEVER AS A UNITARY BLOCK WITH THE CASE (512, 522) | | | | | | |
| 3-1 | IN ORDER TO REDUCE THE OVERALL ASSEMBLING COST OF THE SWITCHING LEVER IN THE ROTATIONAL OPERATION, ASSEMBLE THE SWITCHING LEVER BY RECTILINEAR MOVEMENT 1) WIDEN THE ENGAGEMENT PORTION TIP END, 2) NARROW THE ENGAGEMENT PORTION TIP END | NARROW THE TIP END OF THE SWITCHING LEVER AND ASSEMBLE IT BY RECTILINEAR MOVEMENT (513, 523, 523a) | CASE | 1 | DOWNWARD | 1 | | |
| | | | SWITCHING LEVER | 1 | DOWNWARD | 1 | AESTHETIC SURFACE | 1 |
| | | | | | CLINCHING | 1 | MULTIPLE HOLES | 1 |

FIG. 21B

| RANKING | No | IMPROVEMENT STRUCTURE PLAN | IMPROVEMENT EFFECT |
|---|---|---|---|
| | | BEFORE IMPROVEMENT | 100% |
| 1 | 1-2 | MOLD THE SWITCHING LEVER AS A UNITARY BLOCK WITH THE CASE | 0% |
| 2 | 3-1 | NARROW THE TIP END OF THE SWITCHING LEVER AND ASSEMBLE IT BY RECTILINEAR MOVEMENT | 48% |
| 3 | 1-1 | DIVIDE THE CASE INTO AN UPPER AND A LOWER PORTION AND CHANGE THE ASSEMBLING ORDER INTO THE CASE LOWER PORTION, THE SWITCHING LEVER, AND THE CASE UPPER PORTION | 51% |

METHOD AND SYSTEM FOR SUPPORTING DESIGN

INCORPORATION BY REFERENCE

The present application claims priority from Japanese application JP2006-066906 filed on Mar. 13, 2006, the content of which is hereby incorporated by reference into this application.

BACKGROUND OF THE INVENTION

The present invention relates to a method and system for supporting design of home electric appliances, OA devices, and the like.

As a method for quantitatively evaluating a parts assembling time in the product design, for example, JP-A-2003-39260 discloses a method for analyzing the product parts assembling operation and calculating the assembling time for each of the parts. This is an assembly time estimation method including a step for making about 50 types of assembly operations and attribute assembly difficulties into coefficients in advance, a step for analyzing the assembly operations and attributes of parts of a product, a calculation step for calculating the assembling time of each part according to the analyzed data and the assembly difficulty by using Expression (1) of JP-A-2003-39260 given below, and a step for displaying the calculation result.

$$[\text{Assembly time } t_x] = [t_{operation\ x}] \times [\beta_{attribute\ y1}] \times [\beta_{attribute\ y2}] \times \quad (1),$$

wherein $t_{operation\ x}$ represents the assembling operation time when no attribute exists, and $\beta_{attribute\ y}$ represents a ratio of the affect given to the assembling operation time by the attribute accompanying the assembling operation (assembly difficulty (attribute)).

Moreover, as a method for quantitatively evaluating a defective assembly occurrence ratio, for example, JP-A-10-334151 discloses a method for analyzing a product parts assembling operation and calculating a defective assembly occurrence ratio for each part. This is a defective assembly occurrence ratio estimation method including a step for making defective assembly potential of about 50 types of assembling operations and attributes into coefficients in advance, a step for analyzing product parts assembling operations and attributes, a calculation step for calculating a defective assembly occurrence ratio of each part from the analyzed data and the defective assembly coefficient by using Expression (2) of JP-A-10-334151 given below, and a step for displaying the calculation result.

$$[\text{Defective assembly occurrence ratio } u_x] = [u_{operation\ x}] \times [\theta_{attribute\ y1}] \times [\theta_{attribute\ y2}] \times \quad (2)$$

wherein $u_{operation\ x}$ represents the defective assembly occurrence ratio when no attribute exists, and $\theta_{attribute\ y}$ represents a ratio of the effect given to the defective assembly occurrence ratio by the attribute accompanying the assembling operation (defective assembly coefficient (attribute)).

Moreover, as a method for creating improvements for solving the problems, for example, Matrix 2003: Updating the TRIZ Contradiction Matrix (Darrell Mann, Simon Dewulf, Boris Zlotin, Alla Zusman, CREAX Press, Belgium, 2003) suggests a method for selecting an item to be improved and a problem generated by the improvement from a two-dimensional table and guiding the page describing a hint for the improvement. The method divides an enormous amount of patent items in the past into items to be improved such as "weight of a moving object" and items degraded by the improvement such as "strength of the moving object" and summarizes "how to solve the problems of the items degraded when the improvement item is executed." Firstly, a two-dimensional table is created with "improvement items" arranged vertically and "degraded items" arranged horizontally. Then, at their intersecting points, numbers attached to "the solution examples" are written. Another table is prepared with the numbers and "the solution examples". A designer firstly searches for a corresponding number in the two-dimensional table. Next, the designer searches for the solution example described in the column of the number. Lastly, by referencing the solution example, the designer creates an improvement configuration.

However, even if it is possible to estimate the assembling time for each part and the defective assembly occurrence ratio, it is impossible to know how the assembling operation of the part and the attribute affect the total assembling cost obtained by adding the assembling cost and a loss caused by defective assembly and it is impossible to specify an improvement object. Moreover, even if it is possible to identify a part requiring a long assembling time and a part causing a high defective assembly occurrence ratio, it is impossible to create a configuration plan for improving them.

Moreover, since the aforementioned Matrix 2003 aims at improvement of the basic performance, it has a problem that it cannot be employed for reducing the assembling time concerning a specific part assembling operation and attribute and reducing the defective assembly occurrence ratio.

SUMMARY OF THE INVENTION

It is therefore an object of the present invention to provide a method and a system for supporting design capable of supporting creation of improvement measures to reduce the assembling time and defective assembly and deciding priority of the assembling time reduction measure and the defective assembly reduction measure.

In order to achieve the aforementioned object, the present invention provides a design support method for extracting an improvement guideline for reducing the assembling time and an improvement guideline for reducing the defective assembly in a design to be improved by using the design support system. The method stores in advance, as a database, coefficients indicating assembly difficulties of respective operations and attributes and coefficients indicating defective assembly potentials which have been decided from a plurality of design examples in the past and improvement guideline data collected as improvement guidelines for the assembling operations/attributes and reducing the assembling time of the assembling operations/attributes and improvement guidelines for reducing defective assembly which have been collected and spread in a hierarchy while being correlated with one another. The method extracts elements requiring a long assembling time and elements having a high defective assembly generation ratio from the parts, the assembling operations, and the attributes in the design examples. The extracted elements are converted into assembling costs and assembly loss costs to compare the importance so as to decide the element requiring improvement. The guideline for improving the element is extracted.

According to the present invention, it is possible to extract improvement guidelines for reducing an assembling time and reducing defective assembly by inputting assembling operation analysis data on the product to be improved.

Other objects, features and advantages of the invention will become apparent from the following description of the embodiments of the invention taken in conjunction with the accompanying drawings.

BRIEF DESCRIPTION OF THE DRAWINGS

FIG. 3 shows cross sections indicating assembling operations of a switching lever of a motor-driven device as an example of a product design according to the present invention.

FIG. 4A shows an example of a list of assembling operations and attribute phrases used in analyzing assembling operations.

FIG. 4B shows an analysis result of assembling operations of the switching lever of the motor-driven device shown in FIG. 3.

FIG. 5 shows a data structure for calculating assembly difficulty coefficients.

FIG. 6A is a table showing examples of assembling time/defective assembly improvements in the past and examples of assembling operation analysis.

FIG. 6B is a table showing a method for grouping the past examples of assembling time/defective assembly improvements and extracting a generalized improvement guideline as an high-level concept.

FIG. 6C is a table showing improvement keywords used for grouping in the past examples of assembling time/defective assembly improvements.

FIG. 6D is a table showing contents of an assembling time improvement guideline database extracted from the past examples of assembling time/defective assembly improvements.

FIG. 7 shows a flow of design support processes in the design support system according to an embodiment of the present invention.

FIG. 8 is a table showing an assembling time affecting degree index calculation result for the assembling parts of the motor-driven device shown in FIG. 3.

FIG. 9 is a table showing an assembling part of the motor-driven device shown in FIG. 3 which has been judged to be improved and its improvement guideline.

FIG. 10A shows an example of an improvement configuration plan based on the improvement guideline of the assembling time required for the motor-driven device shown in FIG. 3 and an example of analysis of the assembling operation.

FIG. 10B shows an example of improvement effects obtained by the improvement configuration plan based on the improvement guideline of the assembling time of the motor-driven device shown in FIG. 3.

FIG. 12 is a table showing analysis results of assembling operations of the switching lever of the motor-driven device shown in FIG. 3.

FIG. 13 is a table showing a data structure for calculating the defective assembly coefficient.

FIG. 15 is a table showing results of the defective assembly affecting degree index calculation for the assembling parts of the motor-drive device shown in FIG. 3.

FIG. 16 shows an assembling part of the motor-driven device shown in FIG. 3 which has been judged to be improved and its improvement guideline.

FIG. 17A shows an example of an improvement configuration plan based on the defective assembly improvement guideline of the motor-driven device shown in FIG. 3 and an analysis of its assembling operation.

FIG. 17B shows an example of an improvement effect obtained by the improvement configuration plan based on the defective assembly improvement guideline of the motor-driven device shown in FIG. 3.

FIG. 19 is a table showing integral assembling cost affecting degree index calculation results for the assembling part of the motor-driven device shown in FIG. 3.

FIG. 20 is a table showing an assembling part of the motor-driven device shown in FIG. 3 which has been judged to be improved and its improvement guideline.

FIG. 21A shows an improvement configuration plan based on the integral assembling cost improvement guideline of the motor-driven device shown in FIG. 3 and an example of its assembling operation analysis.

FIG. 21B shows an example of an improvement effect obtained by the improvement configuration plan based on the integral assembling cost improvement guideline of the motor-driven device shown in FIG. 3.

DESCRIPTION OF THE INVENTION

Description will now be directed to embodiments of the present invention with reference to the attached drawings.

Embodiment 1

Firstly, explanation will be given of a design support system according to a first embodiment of the present invention.

Figure 1:
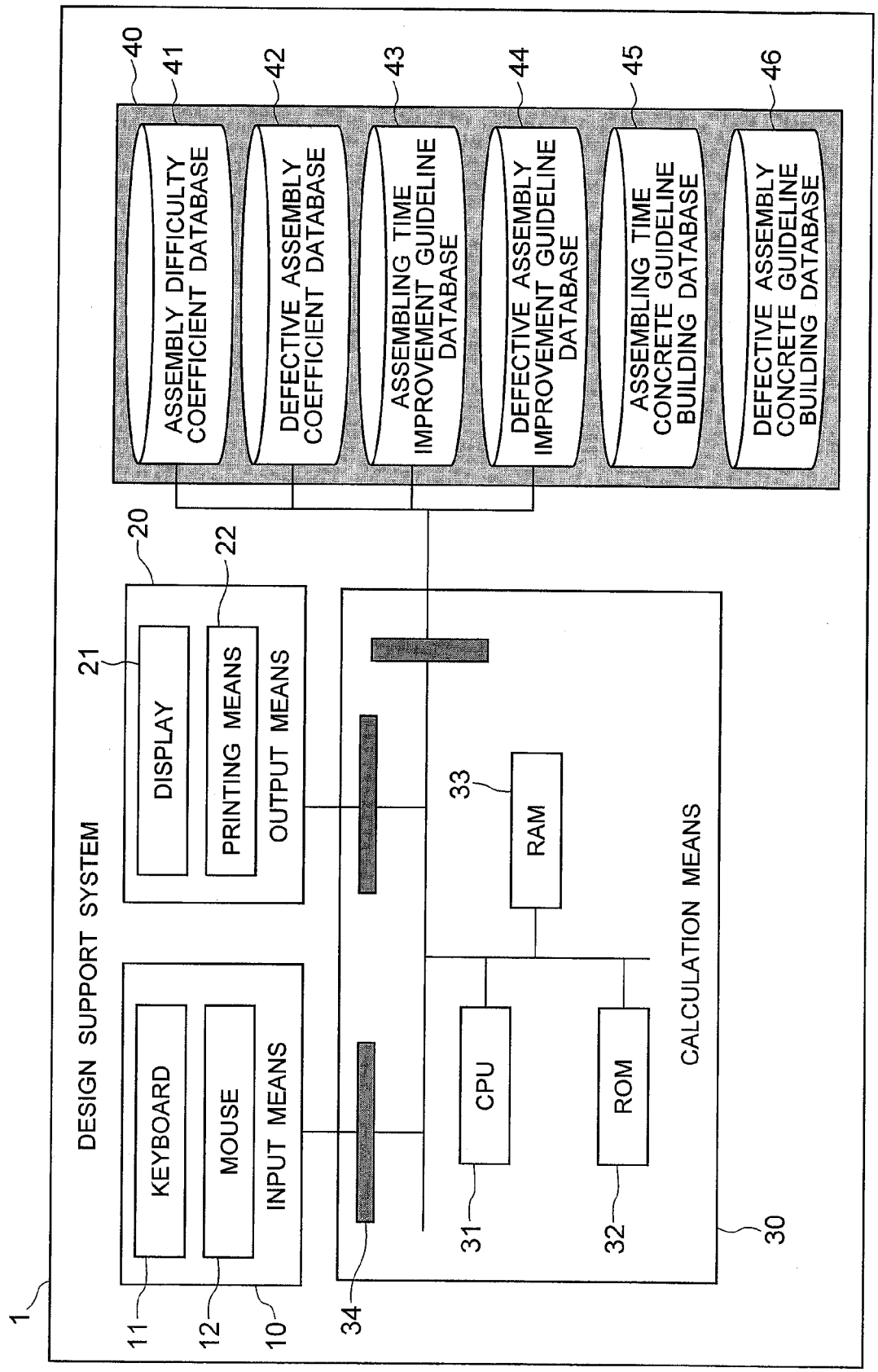
FIG. 1 is a block diagram showing the outline of a design support system according to an embodiment of the present invention.

FIG. 1 is a block diagram showing the outline of a design support system according to an embodiment of the present invention. The design support system 1 according to the present invention includes input means 10, output means 20, calculation means 30, and a database 40. The input means 10 is formed by a keyboard 11, a mouse 12, and the like. The output means 20 is formed by a display 21, printing means 22, and the like. The calculation means 30 is formed by a CPU 31, a ROM 32, a RAM 33, and an I/O unit 34. The calculation means 30 and the display 21 constitute extraction presentation means.

The database unit 40 is formed by an assembly difficulty coefficient database 41, an assembling time improvement guideline database 43, and an assembling time concrete guideline building database 45. It should be noted that a defective assembly coefficient database 42, a defective assembly improvement guideline database 44, and a defective assembly concrete guideline building database 46 are used in the second embodiment and after and not used in the first embodiment.

Figure 2:
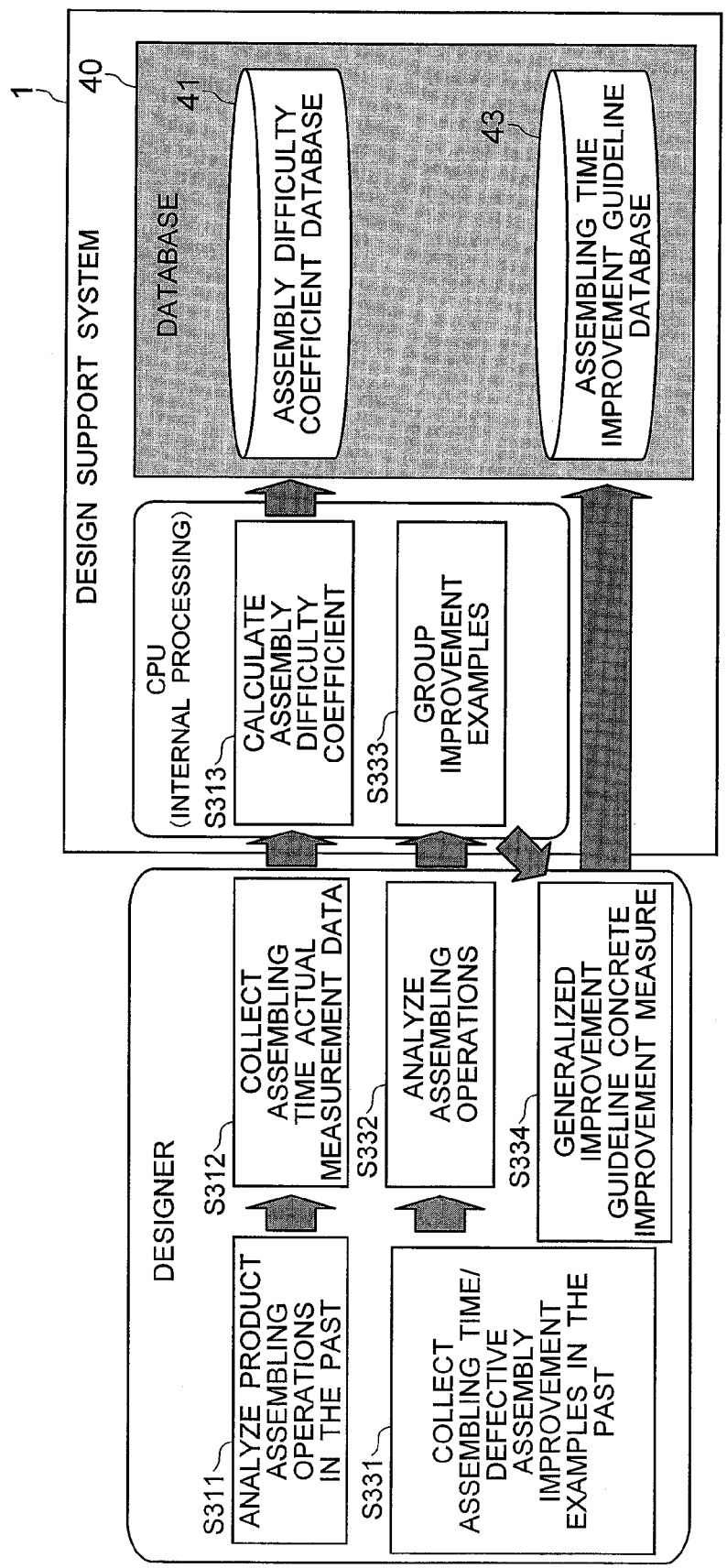
FIG. 2 shows a flow for building a database concerning assembling time reduction in the design support system according to an embodiment of the present invention.

Firstly, explanation will be given of the assembly difficulty coefficient database 41, the assembling time improvement guideline database 43, and the assembling time concrete guideline building database 45. These databases are formed in advance by using the actual product assembling results in the past. FIG. 2 shows a flow of forming the databases 41 and 43 according to the first embodiment.

1-1 Assembly Difficulty Coefficient Database 41

As shown in FIG. 2, assembling operation and assembly difficulty of the attribute helping/hampering the assembling operation are calculated as coefficients from the product assembling operation analysis result in the past and the time required for the corresponding assembling operation and the coefficients are stored in the assembly difficulty coefficient database 41.

In step S311 of FIG. 2, the product assembling operation in the past is analyzed. Here, as shown in FIG. 3, explanation is given through an example of analysis of assembling operation of a switching lever 52 with respect to a case 51 of a motor-driven device. The assembling operation of the case 51 and the switching lever 52 and the attribute helping/hampering the assembling operation is described below.

(1) Move the case 51 downward and place it on an assembling table.

(2) As shown by 1) in FIG. 3, move the switching lever 52 downward. Here, since the case surface 51a is a designed surface, a care should be taken not to scratch it.

(3) As shown by 2) in FIG. 3, push a click arm portion 53 of the switching lever 52 inward.

(4) As shown by 3) in FIG. 3, rotate the switching lever 52 and insert the click arm portion 53 into the case 51. Here, since the case surface 51a is a designed surface, care should be taken not to scratch it. Moreover, since it is difficult to lock a connection portion 54 between the click arm portion 53 and the interior of the case 51, special care should be taken.

(5) As shown by 4) in FIG. 3, press the switching lever 52 into the case 51. Here, the switching lever 52 has three click arm portions 53 which are simultaneously engaged with the case 51.

As shown in FIG. 4A, by using about 50 words and phrases prepared in advance, the aforementioned assembling operation analysis results are summarized into assembling operation analysis data as shown in FIG. 4B.

(1) Part name: Describe the part name directly in the part/name column 611. Moreover, describe the number of parts into the quantity column 612.

(2) Assembling operation: Select an assembling operation of each part from the assembling operation terms prepared in advance and describe it in appearance order in the assembling operation/name column 613. Moreover, describe the number of repetitions of each assembling operation in the repetition quantity column 614.

(3) Attribute: Select an attribute accompanying each assembling operation from the attribute terms prepared in advance and describe it in the attribute/name column 615. Moreover, describe the number of repetitions of each assembling operation in the repetition quantity column 616.

It should be noted that each part, assembling operation, and attribute used in the assembling operation analysis will be called generically an assembling element.

Next, in step S312 of FIG. 2, the assembling time of each of the assembling operations of a product shown in FIG. 3 in the past is measured. The measurement data is added into the operation time column 617 of FIG. 4B. Lastly, input the assembling operation analysis data and the assembling operation time in FIG. 4B into the design support system 1.

Next, in step S313 of FIG. 2, the design support system 1 calculates the assembly difficulty coefficient of each assembling operation and attribute according to the inputted assembling operation analysis data and assembling operation time. The assembly difficulty coefficient of the assembling operation is decided by statistically calculating the assembling time of each assembling operation to obtain a ratio with respect to the downward operation (no attribute). Moreover, the assembly difficulty coefficient of the attribute is decided by statistically calculating the assembling time when a particular attribute accompanies each operation to obtain presence/absence of the ratio.

The assembling time of an assembled product is calculated by adding the assembling time of each part. The assembling time of each part can be calculated by adding the assembling time of respective assembling operations of the part. The assembling time of each assembling operation is decided by the assembling operation and attribute. Accordingly, the assembling time $t_x$ of the assembling operation x is defined by the expression as follows.

$$[\text{Assembling time } t_x] = [t_{operation\ x}] \times [\beta_{attribute\ y1}] \times [\beta_{attribute\ y2}] \times \quad \text{(Expression 1)}$$

wherein $t_{operation\ x}$ represents the assembling operation time when no attribute exists and $\beta_{attribute\ y}$ represents the ratio of the effect given to the assembling operation time by the attribute accompanying the assembling operation (assembly difficulty coefficient (attribute)).

Furthermore, in order to make the assembling operation time $t_{operation\ x}$ dimension-less, the value of the assembling operation time $t_{operation\ x}$ divided by [downward]$t_{Downward\ 0}$ which is the shortest assembling time is defined as the assembly difficulty coefficient $\alpha_{operation\ x}$ of the assembling operation.

$$[\text{assembling operation assembly difficulty coefficient:}$$
$$\alpha_{operation\ x}] = [t_{operation\ x}/t_{Downward\ 0}] \quad \text{(Expression 2)}$$

As shown in FIG. 5, the assembly difficulty coefficient $\alpha_{operation\ x}$ of the assembling operation and the assembly difficulty coefficient $\beta_{attribute\ y}$ of the attribute are calculated from the assembling operation analysis results in various examples including the example of FIG. 3 and actual measurement values of assembling time for each of the assembling operations.

Firstly, the downward operation time $t_{Downward\ 0}$ serving as the reference for estimating the assembling time is calculated as follows.

$$t_{Downward\ 0} = (\Sigma t_{Downward\ i})/n \quad \text{(Expression 3)}$$

Next, the assembly difficulty coefficient $\alpha_{operation\ x}$ of each assembling operation is calculated. Firstly, the deforming operation time $t_{Deforming\ 0}$ is calculated as follows.

$$t_{Deforming\ 0} = (\Sigma t_{Deforming\ i})/n \quad \text{(Expression 4)}$$

Accordingly, the assembly difficulty coefficient $\alpha_{Deforming}$ can be obtained by the following expression.

$$\alpha_{Deforming} = t_{Deforming\ 0}/t_{Downward\ 0} \quad \text{(Expression 5)}$$

Next, the assembly difficulty coefficient $\beta_{attribute\ y}$ of the attribute y is calculated according to the assembling time ratio depending on presence/absence of the attribute y. For example, the assembly difficulty coefficient $\beta_{Aesthetic\ surface}$ of the attribute "aesthetic surface" is expressed as follows.

$$\beta_{Aesthetic\ surface} = (t_{Downward\ Aesthetic\ surface\ 1}/ t_{Downward\ 0} + t_{Rotational\ Aesthetic\ surface\ 2}/ t_{Rotational\ 0} + \ldots)/n \quad \text{(Expression 6)}$$

By using the aforementioned expressions, it is possible to calculate the assembly difficulty coefficient of the assembling operation and the attribute from the inputted assembling operation analysis results and actual measurement data on the assembling operations. These are stored in the assembly difficulty coefficient database of FIG. 2.

By storing assembly difficulty coefficients concerning a plurality of general products prepared in advance in the assembly difficulty coefficient database 41 of FIG. 2, it is possible to use the design support system 1 without executing the steps S311, S312, S313 in FIG. 2.

Moreover, by continuously executing the assembling operation analysis and the assembling operation time measurement and inputting the obtained data into the design support system 1 so as to increase the number of samples, it is possible to set a more reliable assembly difficulty coefficient.

Furthermore, when the product size and the assembling work environment are greatly changed such as in a case that products of completely different size should be produced in an overseas factory, by inputting the assembling operation actual measurement data on the factory and on the product, it is possible to easily set an assembly difficulty coefficient appropriate for the factory.

1-2 Assembling Time Improvement Guideline Database 43

As shown in FIG. 2, a generalized guideline for improving the assembling time is extracted for each assembling element and is stored in the assembling time improvement guideline database 43. It should be noted that since most of the improvement guideline for reducing the assembling time is overlapped with the improvement guideline for reducing the defective assembly, the assembling time reducing guideline and the defective assembly reducing guideline are simultaneously extracted and they are separated from each other when stored in the database.

Firstly, in step S331 of FIG. 2, past examples of the assembling time/defective assembly improvements are collected. The column "past example of assembling time/defective assembly improvements" of FIG. 6A shows examples of improving a ventilator fan, a VTR, and a motor-driven device. Assembling methods of the respective products before the improvements and the improvement examples are described.

In step S332 of FIG. 2, as shown in the assembling operation analysis column of FIG. 6A, the part, the assembling operation, and the attribute of the assembling method before the improvements in the collected improvement examples are analyzed. Lastly, the past examples of the assembling time/defective assembly improvements and the assembling operation analysis data are inputted in the design support system 1.

Next, in step S333 of FIG. 2, the design support system 1 divides the past improvement examples into groups according to the inputted past examples of assembling time/defective assembly improvements and the assembling operation analysis data.

FIG. 6B shows the grouping result. The procedure is as follows.

(1) The design support system 1 extracts the last element of the inputted assembling operation analysis data in FIG. 6A as a target element to be improved.

(2) As shown in FIG. 6C, prepare in advance, a target element/improvement keyword correspondence table summarizing the target elements and the keywords often appearing in improvements of the target elements. The improvement keyword is a word or phrase used when the improvement for the same target element is abstracted and accumulated in the database together with the target element. The design support system 1 classifies the inputted improvement examples of FIG. 6A according to the target elements. Next, the improvement examples of the same target element are classified by the improvement keyword associated with the target element. Lastly, as shown in FIG. 6B, the classification result is displayed on a display 21 of the design support system 1.

(3) In step S334 of FIG. 2, the designer firstly corrects the aforementioned classification results. If there is an improvement example having no corresponding improvement keyword, the designer puts it into another class which is similar.

Moreover, if the classified improvement examples contain an example which is clearly different from the remaining examples, the designer puts it into a more appropriate class.

Next, the designer decides a generalized improvement guideline and a specific improvement plan according to the grouped improvement examples.

The improvement guideline is decided without specifying a technical field so that it can be used in another technical field. In FIG. 6B, for example, improvement examples for reducing the assembling time of a part associated with the "rotational" operation requiring a long assembling time are grouped into a generalized improvement guideline for "assembling by a rectilinear movement" without specifying the technical field such as "a ventilator fan motor" or "a positioning bracket". Furthermore, as a specific improvement plan, "widen the engagement part tip end", "sharpen the engagement part tip end", and the like are extracted.

As shown in FIG. 6D, the target elements, the generalized improvement guidelines, and the specific improvement plans of FIG. 6B are stored in the design support system 1. Here, the improvement guideline associated with the assembling time is stored in the assembling time improvement guideline database 43 of FIG. 2. Moreover, the improvement guideline associated with the defective assembly is stored in the defective assembly improvement database 44 of FIG. 1 which will be detailed later.

1-3 Assembling Time Concrete Guideline Building Database 45

The improvement guidelines stored in the assembling time improvement guideline database 43 are generalized by the aforementioned algorithm and even if they are extracted by an algorithm which will be detailed later, no concrete image can be obtained and it is difficult to judge whether they are good or bad. To cope with this, an associated element is extracted from the inputted assembling elements and a necessary word or phrase is added so as to build a concrete improvement guideline. These algorithms are stored in the assembling time concrete guideline building database 45.

For example, as an improvement guideline for the rotational operation of the switching lever in FIG. 3, "assembling by rectilinear movement" can be extracted from the generalized improvement guideline of FIG. 6D stored in the assembling time improvement guideline database 43. Moreover, as concrete improvement plans, "1) widen the engagement portion tip end" and "2) narrow the engagement portion tip end" can be extracted. However, these are too general and insufficient as the improvement guideline. To cope with this, words or phrases (part: switching lever) are extracted associated with the assembling operation "rotate" from the assembling operation analysis data shown in FIG. 4B.

By using these, a concrete improvement guideline is built as follows.

In order to reduce the rotational operation time of the "switching lever", the "switching lever" is assembled by rectilinear movement.

1) widen the engagement portion tip end
2) narrow the engagement portion tip end Thus, it is possible to specify a generalized improvement guideline "Assemble by rectilinear movement, 1) widen the engagement portion tip end, and 2) narrow the engagement portion tip end"

The databases 41, 43, 45 may be collected, not by the design support system 1, but by another design support system and transmitted to the design support system 1 via a network so as to be stored there.

Next, explanation will be given of an improvement design for reducing the assembling time in the design support system 1 according to the first embodiment of the present invention.

FIG. 7 shows a design support process flow in the design support system 1 according to the first embodiment. FIG. 8 shows the results of the assembling time affecting degree indexes calculated in the system from the inputted assembling operation analysis data. FIG. 9 shows a display 21 according to the first embodiment.

Moreover, FIG. 10A shows improvement configuration examples created according to the improvement guideline displayed on the display 21 and its assembling operation analysis data. Furthermore, FIG. 10B shows improvement effects displayed on the display 21.

2-1 Assembling Operation Analysis Data Input

In step S101 of FIG. 7, input the assembling operation analysis data into the design support system 1. For example, the assembling operation shown in FIG. 3 is analyzed by the parts constituting a product, assembling operations of the respective parts, and the attribute accompanying the operations. The analysis results are summarized as the assembling operation analysis data in a table as shown in FIG. 4B and the data is inputted to the design support system 1.

In step S102 of FIG. 7, the design support system 1 displays the inputted assembling operation analysis data on the display 21 as shown in FIG. 4B.

2-2 Assembling Time Affecting Degree Index Calculation

In step S103 of FIG. 7, the design support system 1 extracts a coefficient of each element of the inputted assembling operation analysis data from the coefficients of the respective assembling elements stored in the assembly difficulty coefficient database 41 and calculates the assembling time affecting degree index of the part, assembling operation, and attribute. A product is formed by a plurality of parts. Parts are assembled by several assembling operations. Furthermore, an assembling time difference of the entire product between presence and absence of these assembling elements is divided by the entire assembling time and multiplied by 100 to obtain a value which is defined as an assembling time affect degree index.

(1) An assembling time difference caused by the presence and absence of one part can be considered to be the time required for the part. The time difference is divided by the total assembling time and multiplied by 100 to obtain a value which is defined as the part index of the assembling time affecting degree index.

(2) An assembling time difference caused by the presence and absence of one assembling operation can be considered to be the time required for the assembling operation. The time difference is divided by the total assembling time and multiplied by 100 to obtain a value which is defined as the assembling operation index of the assembling time affecting degree index.

(3) An assembling time difference caused by the presence and absence of one attribute can be considered to be the time required for the attribute. The time difference is divided by the total assembling time and multiplied by 100 to obtain a value which is defined as the attribute index of the assembling time affecting degree index.

In the case of assembling of the switching lever shown in FIG. 3, the assembling time affecting degree index is calculated as follows. Here, it is assumed that the total product assembling time is 100 seconds and the standard downward operation time $t_{Downward\ 0}$ in this factory is 11 seconds.

(1) Assembling time affecting degree index $e_{Deforming}$ of switching lever deforming operation 1) Switching lever deforming operation time $t_{Deforming} \times 2 = t_{Downward\ 0} \times \alpha_{Deforming} \times 2 = 11 \times 1.73 \times 2 = 38$ seconds 2) Assembling time affecting degree index $e_{Deforming} = (100-(100-38)) \times 100/100 = 38$ (2) Assembling time affecting degree index $e_{Rotational}$ of switching lever rotational operation 1) Switching lever rotational operation time $t_{Rotational\ Aesthetic\ surface\ Hidden} = t_{Downward\ 0} \times \alpha_{Rotational} \times \beta_{Aesthetic\ surface} \times \beta_{Hidden} = 11 \times 2.63 \times 1 \times 1 = 29$ seconds 2) Assembling time affecting degree index $e_{Rotational} = (100-(100-29)) \times 100/100 = 29$ (3) Switching lever assembling time affecting degree index $e_{switching\ lever}$ 1) Switching lever assembling operation time $t_{switching\ lever} = t_{Downward\ 0} + t_{Deforming} + t_{Rotational\ Aesthetic\ surface\ Hidden} + t_{Clinching\ Multiple\ holes} = 89$ seconds 2) Assembling time affecting degree index $e_{switching\ lever} = (100-(100-89)) \times 100/100 = 89$ FIG. 8 shows the calculation results of the assembling time affecting degree index in this example. Since the switching lever requires difficult assembling operations such as deforming, rotational, and pressed engagement, the assembling time affecting degree index as a part is as high as 89.

In this example, the assembling time affecting degree index of each assembling element is shown assuming 100 as the total assembling time. It should be noted that instead of the assembling time affecting index, it is possible to use the assembling time itself.

Here, as shown in step S104 of FIG. 7, by displaying the calculated assembling time affecting degree index at this stage on the display, the designer can think about improvement by narrowing the improvement objects as shown in step S105.

2-3 Extraction of Assembling Element Requiring Improvement

In step S106 of FIG. 7, an assembling element requiring improvement is extracted from the calculated assembling time affecting degree indexes.

In this example, the following three elements having high assembling time affecting degree indexes are extracted:

(1) "switching lever"
(2) "deforming" operation of the switching lever
(3) "rotational" operation of the switching lever 2-4 Generalized Improvement Plan Extraction In step S107 of FIG. 7, a generalized improvement guideline for improving the assembling element requiring improvement is extracted from the extracted assembling elements (part, assembling operation, attribute) requiring improvements and target element/improvement guideline data as shown in FIG. 6D stored in the assembling time improvement guideline database 43. Examples of generalized improvement guidelines extracted are as follows.

(1) Assembling element requiring improvement (part): "switching lever"
→improvement guideline: "divide the part to be assembled and change the assembling order, 1) the part whose assembling is difficult is assembled lastly"; "unify it with another part, 1) outsert molding, 2) use of elasticity of member"

(2) Assembling element requiring improvement (assembling operation): "deforming"
→improvement guideline: "degrade the deforming operation, 1) directly attach to the substrate"; "use the part to be assembled as a jig, 1) form a tapered portion on an engagement portion"

(3) Assembling element requiring improvement (assembling operation): "rotational"

→improvement guideline: "assemble by rectilinear operation, 1) widen the engagement portion tip end, 2) narrow the engagement portion tip end"

2-5 Building Concrete Improvement Guideline

In step S108 of FIG. 7, the assembling element associated with the aforementioned generalized improvement guideline is extracted from the concrete improvement plan building database 45 and a word or a phrase is added to build a concrete improvement guideline from the generalized improvement guideline. An example of a concrete improvement guideline which has been built is shown below.

(1) Generalized improvement guideline: "divide the part to be assembled and change the assembling order, 1) the part whose assembling is difficult is assembled lastly"
→associated phrase: "switching lever"
→concrete improvement guideline: "in order to reduce the assembling time of the [switching lever], [divide the part to be assembled and change the assembling order, 1) the part whose assembling is difficult is assembled lastly]"

(2) Generalized improvement guideline: "eliminate the need of deforming operation"
→associated phrase: [switching lever], [deforming]
→concrete improvement guideline: "in order to reduce the [deforming] operation time of the [switching lever], [eliminate the need of deforming operation, 1) directly attach to the substrate] of the [switching lever]"

(3) Generalized improvement guideline: "assemble by rectilinear movement, 1) widen the engagement portion tip end"
→associated phrase: [assemble by rectilinear movement], [rotational]
→concrete improvement guideline: "in order to reduce the [rotational] operation time of the [switching lever], [assemble the [switching lever] by rectilinear movement, 1) widen the engagement portion tip end]"

In step S109 of FIG. 7, as shown in FIG. 9, these concrete improvement guidelines are displayed together with the associated assembling elements and the assembling time affecting degree index on the display 21. That is, the improvement-requiring assembling element column 621 in FIG. 9 displays the selected part name, the assembling operation name, the attribute name, the associated assembling elements, and the assembling time affecting degree index.

Moreover, the concrete improvement guideline display column 622 in FIG. 9 displays the concrete improvement guideline for improving the selected elements.

2-6 Assembling Time Reduction Improvement Configuration Creation, and Assembling Operation Analysis As shown in FIG. 10A, in step S110 of FIG. 7, the designer can easily create an improvement plan by referencing the concrete improvement guideline of FIG. 9 displayed on the display 21. Furthermore, in step S111 of FIG. 7, the designer analyzes the assembling operation of the created improvement plan and inputs the analysis data into the design support system 1.

(1) By referencing the improvement guideline 1-1 "in order to reduce the switching lever assembling time, divide the part to be assembled and change the assembling order, 1) assemble the part whose assembling is difficult lastly", the designer can create the improvement configuration plan as follows.

"Divide the case 51 into an upper and a lower portion and change the assembling order into the case lower portion 511, the switching lever 521 and the case upper portion 511a." The assembling operations are as follows:

1) Place the case lower portion 511 on the working table.
2) Mount the switching lever 521 on the case lower portion 511. Here, since the surface of the case lower portion 511 is a designed surface, a care should be taken in the assembling operation.
3) Assemble the case upper portion 511a to the case lower portion 511.

(2) By referencing the improvement guideline 1-2 "in order to reduce the switching lever assembling time, unify it with another part, 1) outsert molding, 2) use of elasticity of member", the designer can create the following improvement configuration plan.

"Mold the switching button 522 replacing the switching lever 522 together with the case 512 as a unitary block"

By the elasticity of the case 512, the pressed switching button 522 is automatically restored. In this case, at the stage when the case 512 is molded, the member performing the switching lever function is molded and no assembling operation is required.

(3) By referencing the improvement guideline 3-1 "in order to reduce the switching lever rotational operation time, assemble the switching lever by rectilinear movement, 1) widen the engagement portion tip end, 2) narrow the engagement portion tip end", the designer can create the following improvement configuration plan.

"Narrow the tip end 523a of the switching lever 523 and assemble it by rectilinear movement"

The assembling operation is as follows.

1) Place the case lower portion 513 on the working table.
2) Move the switching lever 523 downward and mount its tip end 523a on the case lower portion 513. Here, since the surface of the case 513 is a designed surface, a care should be taken in the assembling operation.
3) Clinch the switching lever 523 into the case 513. Here, a care should be taken so that the three tip ends 523a of the switching lever are simultaneously engaged with the case.

In step S112 of FIG. 7, the design support system 1 displays the assembling operation analysis data on the inputted improvement configuration plan as shown in FIG. 10A on the display 21.

2-7 Calculating the Assembling Time

In step S113 of FIG. 7, the assembling time is calculated from the assembling operation analysis data before the improvement shown in FIG. 4B inputted in step S101 of FIG. 7, the assembling operation analysis data on the improvement configuration plan shown in FIG. 10A inputted in step S111 of FIG. 7, and the assembly difficulty coefficient DB (database) 41 of FIG. 7. As shown in FIG. 10B and step 114 of FIG. 7, the calculation results are displayed on the display 21. It should be noted that FIG. 10B shows an example of a bar graph but the calculation results may also be indicated in numeric values. Moreover, FIG. 10B shows the calculation result in percentage but they may also be indicated by the assembling time.

Thus, the designer can examine the concrete configuration in the descending order of the improvement effect and can effectively perform the improvement design.

Embodiment 2

Next, explanation will be given of the improvement design for reducing the defective assembly in the design support system 1 according to a second embodiment of the present invention.

FIG. 1 shows the outline of the configuration of the design support system according to the embodiment of the present invention. The design support system 1 according to the invention includes the input means 10, the output means 20, the calculation means 30, and the database unit 40 like in the first embodiment.

Moreover, the database unit 40 is formed by a defective assembly coefficient database 42, a defective assembly improvement guideline database 44, and a defective assembly concrete guideline building database 46. It should be noted that the assembly difficulty coefficient database 41, the assembling time improvement guideline database 43, and the assembling time concrete guideline building database 45 are not used in this embodiment.

Figure 11:
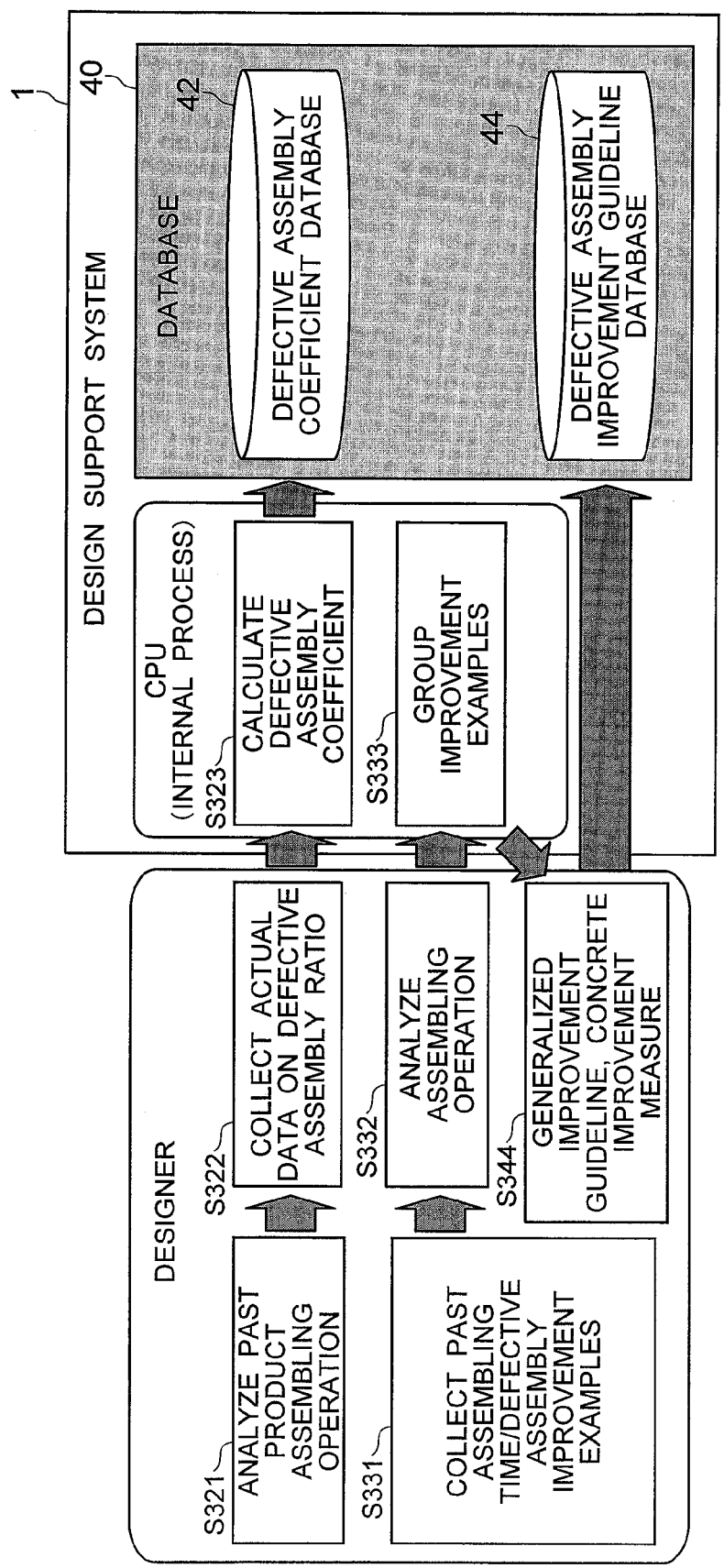
FIG. 11 shows a flow of design support processes in the design support system according to a second embodiment of the present invention.

Firstly, explanation will be given of the defective assembly coefficient database 42, the defective assembly improvement guideline database 44, and the defective assembly concrete guideline building database 46. These databases are built from the actual occurrence of defective assembly in the past. FIG. 11 shows the building flow of the databases 42, 44 in this embodiment.

1-1 Defective Assembly Coefficient Database 42

As shown in FIG. 11, the defective assembly results generated by assembling operations corresponding to the past product assembling operation analysis results are used to calculate a defective assembly potential of the assembling operation and attribute helping/hampering the assembling operation and the calculation result is stored in the defective assembly coefficient database 42.

Firstly, in step S321 of FIG. 11, the past product assembling operations are analyzed. Here, like in the first embodiment, an example of assembling operations of the switching lever 52 to the case 51 of a motor-driven device is given as shown in FIG. 3. FIG. 12 shows the assembling operation analysis results.

Next, in step S322 of FIG. 11, a past defective assembly generation ratio of the product shown in FIG. 3 is checked. The check data is added to the defective assembly generation ratio column 618 in FIG. 12. Lastly, the designer inputs the assembling operation analysis data and the defective assembly generation ratio of FIG. 12 into the design support system 1.

Next, in step S323 of FIG. 2, the design support system 1 calculates the defective assembly coefficients of the respective assembling operations and attributes from the inputted assembling operation analysis data and the defective assembly generation ratio. The defective assembly coefficient of an assembling operation is decided by statistically calculating the defective assembly generation ratio of each assembling operation using the downward operation (no attribute) as a reference. Moreover, the defective assembly coefficient of an attribute is decided according to the ratio of presence/absence of the defective assembly generation as a result of statistical calculation of a specific attribute accompanying each operation.

The defective assembly generation ratio of an assembled product can be calculated by adding the defective assembly generation ratio of the respective parts constituting the product. The defective assembly generation ratio of each part can be calculated by the total of the defective assembly generation ratios of the respective assembling operations of the part. The defective assembly generation ratio of each assembling operation is decided by its assembling operation and the attribute. Accordingly, the defective assembly generation ration $u_x$ of the assembling operation is defined by the following expression.

[Defective assembly generation ratio $u_x$] =
$[u_{operation\,x}] \times [\theta_{attribute\,y1}] \times [\theta_{attribute\,y2}] \times$  (Expression 7)

wherein $u_{operation\,x}$ represents the defective assembly generation ratio when no attribute exists, and $\theta_{attribute\,y}$ represents a ratio of the effect given to the defective assembly generation ratio by the attribute accompanying the assembling operation (defective assembly coefficient (attribute)).

Furthermore, in order to make the defective assembly generation ratio $u_{operation\,x}$ dimension-less, the value of the defective assembly generation ratio $u_{operatation\,x}$ divided by the [downward operation] $u_{Downward\,0}$ having the smallest defective assembly generation ratio is defined as the defective assembly coefficient $\gamma_{operation\,x}$ of the assembling operation.

[Defective assembly coefficient of assembling operation: $\gamma_{operation\,x}$] = $[u_{operation\,x}]/[u_{Downward\,0}]$  (Expression 8)

As shown in FIG. 13, the defective assembly coefficient $\gamma_{operation\,x}$ of the assembling operation is calculated from the assembling operation analysis results in various examples including the example of FIG. 12 and the actual result value of the defective assembly generation ratio of each assembling operation.

Firstly, the defective downward generation ratio $u_{Downward\,0}$ as the reference of the defective assembly generation ratio is calculated from the following expression.

$U_{Downward\,0} = (\Sigma u_{Downward\,i})/n$  (Expression 9)

Next, the defective assembly coefficient $\gamma_{operation\,x}$ of each assembling operation is calculated. For example, the defective deforming generation ratio $u_{Deforming\,0}$ is calculated by the following expression.

$u_{Deforming\,0} = (\Sigma u_{Deforming\,i})/n$  (Expression 10)

Accordingly, the defective assembly coefficient $\gamma_{Deforming}$ of the deforming operation is obtained by the following expression.

$\gamma_{Deforming} = u_{Deforming\,0}/u_{Downward\,0}$  (Expression 11)

Next, the defective assembly coefficient $\gamma_{attribute\,y}$ of the attribute y is calculated from the ratio of the defective assembly generation ratio between the presence/absence of the attribute y. For example, the defective assembly coefficient $\theta_{Aesthetic\,surface}$ of the attribute "aesthetic surface" is obtained by the following expression.

$\theta_{Aesthetic\,surface} = (u_{Downward\,Aesthetic\,surface\,1'}/$
$u_{Downward\,0} + u_{Rotational\,Aesthetic\,surface\,2'}/$
$u_{Rotational\,0} + \ldots)/n$  (Expression 12)

As has been described above, it is possible to calculate the defective assembly coefficients of the operation and the attribute from the inputted assembling operation analysis result and the defective assembly generation ratio actual result data. These are stored in the defective assembly coefficient database 42 in FIG. 11.

By storing the defective assembly quantity associated with a plurality of general products prepared in advance, in the database 42, it is possible to use the design support system 1 without executing the steps S321, S322, S323 in FIG. 11.

Moreover, by continuously inputting the assembling operation analysis results and the actual result data on the defective assembly generation ratio so as to increase the number of samples, it is possible to set a more reliable defective assembly coefficient.

Furthermore, when the product size and the assembling work environment are greatly changed in such a case that products of completely different size should be produced in an overseas factory, by inputting the actual result data on the defective assembly generation ratio of the product in the factory, it is possible to easily set a defective assembly coefficient appropriate for the factory.

1-2 Defective Assembly Improvement Guideline Database 44

As shown in FIG. 11, a generalized guideline for reducing the defective assembly generation ratio is extracted for each of the assembling elements and stored in the defective assembly improvement guideline database 44. It should be noted that as has been described in the first embodiment, most of the improvement guideline for reducing the assembling time is overlapped with the improvement guideline for reducing the defective assembly. Accordingly, the assembling time reducing improvement guideline and the defective assembly reducing guideline are simultaneously extracted and they are separated at the stage when they are stored in the database. Consequently, the steps S331, S332, S333, S3334 in FIG. 2 are identical to the steps S331, S332, S333, S3334 in FIG. 11.

The improvement guideline is decided without specifying a particular technical field so that it can be used in other technical fields. In FIG. 6B, for example, in the improvement example for reducing the defective assembly potential of a part having a high defective assembly potential with the attribute that "it is difficult to view the connection portion", grouping is performed with the generalized improvement guideline that "the connection portion is rearranged in a visible region" without specifying technical fields of "the ventilator fan", "the motor mounting bracket", or "the fixing screw.". The grouping is extracted as the generalized improvement guideline.

As shown in FIG. 6D, the target element and the generalized improvement guideline in FIG. 6B are stored in the design support system 1. Here, the improvement guideline concerning the defective assembly is stored in the defective assembly improvement database 44 in FIG. 11.

1-3 Defective Assembly Concrete Guideline Building Database 46

Since the improvement guideline stored in the defective assembly improvement guideline database 44 is generalized by the aforementioned algorithm, when it is extracted by an algorithm which will be detailed later, no concrete image is formed and it is difficult to decide whether it is good or bad. To cope with this, an element associated with the inputted assembling element is extracted and a necessary word or phrase is added so as to build a concrete improvement guideline. These algorithms are stored in the defective assembly concrete guideline building database 46.

For example, as the improvement guideline corresponding to the attribute "it is difficult to view the connection portion" accompanying the rotational operation of the switching lever in FIG. 12, it is possible to extract "rearrange the connection portion in a visible region" from the generalized improvement guideline in FIG. 6D stored in the defective assembly improvement guideline database 44. However, this is too general and insufficient as the improvement guideline. To cope with this, firstly, words and phrases associated with the attribute "hidden" (it is difficult to view the connection portion) (part: Switching lever; assembling operation: rotational) are extracted from the assembling operation analysis data shown in FIG. 12.

By using them, a concrete improvement plan as follows is built up.

"In order to reduce the operation time of "rotational" accompanied by the attribute "hidden" (it is difficult to view the connection portion) of "the switching lever", "rearrange the connection portion in the visible region."

Thus, it is possible to specify the generalized guideline as a concrete guideline "rearrange the connection portion in the visible region".

The databases 42, 44, 46 may be collected, not by the design support system 1, but by another design support system and transmitted to the design support system 1 via the network.

Next, explanation will be given of the improvement design for reducing the defective assembly in the design support system 1 according to the second embodiment of the present invention.

Figure 14:
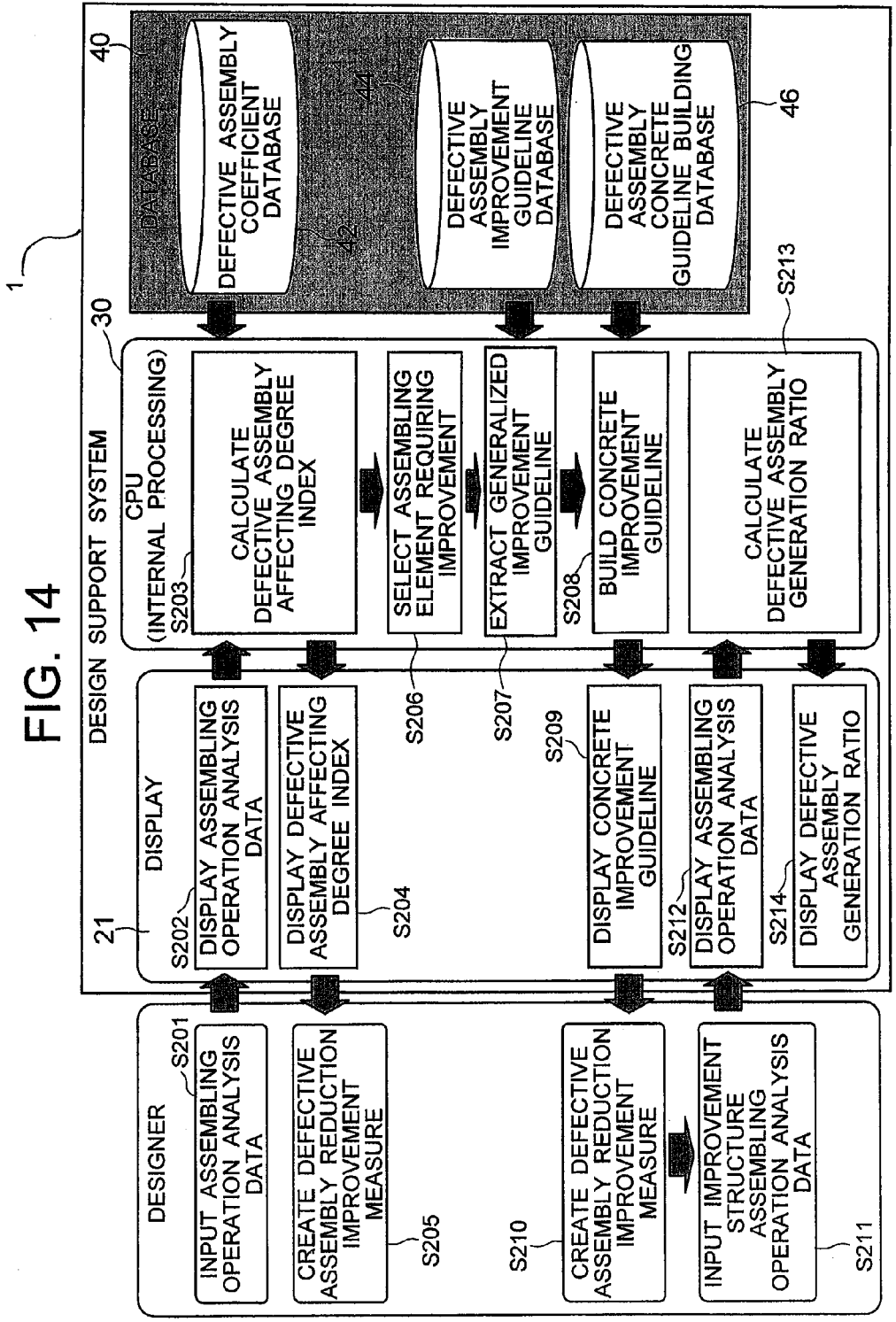
FIG. 14 shows a flow of design support processes in the design support system according to the second embodiment of the present invention.

FIG. 14 shows a design support process flow in the design support system 1 according to the second embodiment. FIG. 15 shows results of the defective assembly affecting degree index calculated in the system from the inputted assembling operation analysis data. FIG. 16 shows a display 21 according to the second embodiment. Moreover, FIG. 17A shows the example of the improvement configuration created according to the improvement guideline displayed on the display 21. Furthermore, FIG. 17B shows the improvement effects displayed on the display 21.

2-1 Inputting Assembling Operation Analysis Data

In step S201 in FIG. 14, the assembling operation analysis data is inputted into the design support system 1. For example, the assembling operations shown in FIG. 3 are analyzed into parts constituting a product, assembling operations of the respective parts, and attributes accompanying the operations so as to be summarized into the assembling operation analysis data as shown in FIG. 12, which is inputted into the design support system 1.

In step S202 of FIG. 14, the design support system 1 displays the inputted assembling operation analysis data on the display 21 as shown in FIG. 12.

2-2 Calculating Defective Assembly Affecting Degree Index

In step S203 of FIG. 14, the design support system 1 extracts the coefficients of the respective elements of the inputted assembling operation analysis data from the coefficients of the respective assembling elements stored in the defective assembly coefficient database 42 and calculates the defective assembly affecting degree indexes of parts, assembling operations, and attributes. A product is formed by a plurality of parts. A part is assembled by several assembling operations. Furthermore, the assembling operations have attributes helping or hampering this. The difference between the defective assembly generation ratios of the entire product when these assembling elements are present and absent is divided by the entire defective assembly generation ratio and multiplied by 100 to obtain a defective assembly affecting degree index.

(1) The difference between the defective assembly generation ratios when a part is present and absent is considered to be a defective assembly generated by the presence of the part. The difference between the defective assembly generation ratios is divided by the entire defective assembly generation ratio and multiplied by 100 to obtain a part index of the assembling time affecting degree index.

(2) The difference between the defective assembly generation ratios when an assembling operation is present and absent is considered to be a defective assembly generated by the presence of the assembling operation. The difference between the defective assembly generation ratios is divided by the entire defective assembly generation ratio and multiplied by 100 to obtain an assembling operation index of the defective assembly affecting degree index.

(3) The difference between the defective assembly generation ratios when an attribute is present and absent is considered to be a defective assembly generated by the presence of the attribute. The difference between the defective assembly generation ratios is divided by the entire defective assembly generation ratio and multiplied by 100 to obtain an attribute index of the defective assembly affecting degree index.

In the case of the switching lever shown in FIG. 3, the defective assembly affecting degree index is calculated as follows. Here, it is assumed that the defective assembly generation ratio of the entire product is 100 ppm and the defective assembly generation ratio $u_{Downward\ 0}$ generated in the downward operation of a standard part in this factory is 1 ppm.

(1) Defective assembly affecting degree index of the switching lever rotational operation $e_{Rotational}$ 1) Defective assembly generation ratio in the switching lever rotational operation
$u_{Rotational\ Aesthetic\ surface\ Hidden} = u_{Downward\ 0} \times \gamma_{Rotational} \times \theta_{Aesthetic\ surface} \times \theta_{Hidden} = 1 \times 11 \times 1 \times 5.18 = 57$ ppm 2) Defective assembly affecting degree index $e_{Rotational} = (100-(100-57)) \times 100/100 = 57$ (2) Defective assembly affecting degree index of the attribute that it is difficult to view the connection portion accompanying the switching lever rotational operation $e_{Hidden}$ 1) Defective assembly generation ratio when the attribute that it is difficult to view the connection portion is absent in the switching lever rotational operation
$u_{Rotational\ Aesthetic\ surface} = u_{Downward\ 0} \times \gamma_{Rotational} \times \theta_{Aesthetic\ surface} = 1 \times 11 \times 1 = 11$ ppm 2) Defective assembly affecting degree index $e_{Rotational} = (57-11) \times 100/100 = 46$ (3) Defective assembly affecting degree index of the switching lever $e_{switching\ lever}$ 1) Defective assembly generation ratio of the switching lever $u_{switching\ lever} = u_{Downward\ 0} + u_{Deforming} + u_{Rotational\ Aesthetic\ surface\ Hidden} + u_{Clinching\ Multiple\ holes} = 99$ ppm 2) Defective assembly affecting degree index $e_{switching\ lever} = (100-(100-99)) \times 100/100 = 99$ FIG. 15 shows the calculation results of the defective assembly affecting degree indexes in this case. Since the switching lever requires assembling operations of a high defective assembly potential such as rotational and pressed engagement and attributes of a high defective assembly potential such that the designed surface is present and it is difficult to view the connection portion, the defective assembly affecting degree index as a part is as high as 99. Moreover, the switching lever rotational operation has a high defective assembly potential of the rotational operation itself and attributes of a high defective assembly potential such that the designed surface is present and it is difficult to view the connection portion. Accordingly, the defective assembly affecting degree index as the assembling operation is as high as 57. Furthermore, the attribute that it is difficult to view the connection portion in the switching lever rotational operation has a high defective assembly potential of the attribute itself and the attribute accompanies the rotational operation which has the attribute that the designed surface is present. Accordingly, the defective assembly affecting degree index is as high as 46.

In this example, the defect affecting degree index of each assembling element is displayed when the entire defect generation ratio is 100. It should be noted that instead of the defect affecting degree index, it is possible to use the defect generation ratio itself.

As shown in step S204 in FIG. 14, the calculated defective assembly affecting degree indexes are displayed on the display at this stage, and the designer can narrow the improvement objects as shown in step S205.

2-3 Extracting Assembling Elements to be Improved

In step S206 in FIG. 14, the assembling elements requiring improvements are extracted according to the calculated defective assembly affecting degree indexes.

In this example, as shown in FIG. 15, the following three elements are extracted as the elements having high defective assembly affecting degree indexes:

(1) "switching lever"
(2) "rotational" operation of the switching lever
(3) attribute "hidden" (it is difficult to view the connection portions) accompanying the rotational operation of the switching lever 2-4 Extracting Generalized Improvement Guideline In step S207 in FIG. 14, generalized improvement guidelines for improving the assembling elements requiring improvements are extracted from the extracted assembling elements requiring improvements (part, assembling operation, attribute) and the target element/improvement guideline data stored in the defective assembly improvement guideline database 44 as shown in FIG. 6D. The extracted generalized improvement guidelines are as follows.

(1) Element requiring improvement (part): "switching lever"
→Improvement guideline: "Divide the part to be assembled and change the assembling order, 1) the part which is difficult to be assembled is assembled lastly"
"Unify with other part, 1) outsert molding, 2) use elasticity of member"

(2) Element requiring improvement (assembling operation): "rotational"
→Improvement guideline: "assemble with rectilinear movement, 1) widen the engagement portion tip end, 2) narrow the engagement portion tip end"

(3) Element requiring improvement (attribute): "hidden" (it is difficult to view the connection portion)
→Improvement guideline: "rearrange the connection portion into a visible region"

2-5 Building Concrete Improvement Guideline

In step S208 in FIG. 14, assembling elements associated with the aforementioned generalized improvement guidelines are extracted from the concrete improvement guideline building database 46. By adding words and phrases, concrete improvement guidelines are built from the generalized improvement guidelines. An example of the concrete improvement guidelines which have been built up is given below.

(1) Generalized improvement guideline: "Divide the part to be assembled and change the assembling order, 1) the part which is difficult to be assembled is assembled lastly"
→associated phrase: [switching lever]
→concrete improvement guideline: "In order to reduce the defective assembly of the [switching lever], [divide the part to be assembled and change the assembling order]"

(2) Generalized improvement guideline: "unify with other part, 1) outsert molding, 2) use elasticity of member"
→associated phrase: [switching lever]
→concrete improvement guideline: "In order to reduce the defective assembly of the [switching lever], [divide the part to be assembled and change the assembling order]"

(3) Generalized improvement guideline: "assemble with rectilinear movement, 1) widen the engagement portion tip end, 2) narrow the engagement portion tip end"
→associated phrase: [switching lever], [rotational]
→concrete improvement guideline: "In order to reduce the defective assembly of the [switching lever] in the [rotational] operation, assemble the [switching lever] [with rectilinear movement, 1) widen the engagement portion tip end, 2) narrow the engagement portion tip end]"

(4) Generalized improvement guideline: "rearrange the connection portion into a visible region"
→associated phrase: [switching lever], [rotational], [it is difficult to view the connection portion]
→concrete improvement guideline: "In order to reduce the defective assembly in the [rotational] operation accompanied by the attribute [it is difficult to view the connection portion] of the [switching lever], [rearrange the connection portion into a visible region]"

In step S209 in FIG. 14, as shown in FIG. 16, these concrete improvement guidelines are displayed on the display 21 together with the associated assembling elements and the defective assembly affecting degree indexes. That is, the column of elements requiring improvements 621 in FIG. 16 displays the selected part name, the assembling operation name, the attribute name, the associated assembling element, and the defective assembly affecting degree index.

Moreover, the concrete improvement guideline display column 622 in FIG. 16 displays the concrete improvement guideline for improving the selected elements.

2-6 Creating Plan for Reducing/Improving Defective Assembly and Analyzing Assembling Operation As shown in FIG. 17A, in step S210 of FIG. 14, the designer can easily create an improvement plan by referencing the concrete improvement guidelines of FIG. 16 displayed on the display 21. Furthermore, in step S211 of FIG. 14, the designer analyzes the assembling operation in the created improvement plan and inputs the analysis data into the design support system 1.

(1) By referencing the improvement guideline 1-1 "in order to reduce the defective assembly of the switching lever, divide the part to be assembled and change the assembling order, 1) the part which is difficult to be assembled is assembled lastly", the designer can create the following improvement plan.

"Divide the case 51 into an upper and a lower portion and change the assembling order into the case lower portion 511, the switching lever 521, and the case upper portion 511a."
The assembling operations are as follows:
1) Place the case lower portion 511 on the working table.
2) Mount the switching lever 521 on the case lower portion 511. Here, since the surface of the case lower portion 511 is a designed surface, a care should be taken in the assembling operation.
3) Assemble the case upper portion 511a with the case lower portion 511.

(2) By referencing the improvement guideline 1-2 "In order to reduce the defective assembly of the switching lever in the rotational operation, assemble the switching lever with rectilinear movement, 1) widen the engagement portion tip end, 2) narrow the engagement portion tip end", the designer can create the following improvement plan.

"Narrow the tip end 523a of the switching lever 523 and assemble it by rectilinear movement"
The assembling operations are as follows.
1) Place the case lower portion 513 on the working table.
2) Move the switching lever 523 downward and place its tip end 523a on the case lower portion 513. Here, since the surface of the case 513 is a designed surface, a care should be taken in the assembling operation.
3) Insert the switching lever 523 in the case 513 with pressure. Here, a care should be taken in the assembling operation so as to simultaneously insert the three tip end portions 523a of the switching lever.

(3) By referencing the improvement guideline 3-1 "In order to reduce the defective assembly of the switching lever in the rotational operation having the attribute that it is difficult to view the connection portion of the switching lever, rearrange the connection portion of the switching lever in a visible region", the designer can create the following improvement plan.

"Extend the tip end 524a of the switching lever 524 and rearrange the connection portion in a visible region"
The assembling operations are as follows.
1) Place the case lower portion 514 on the working table.
2) Move the switching lever 524 downward. Here, since the surface of the case 514 is a designed surface, a care should be taken in the assembling operation.
3) Deform the click arm portion 524a of the switching lever 524 to the inward direction.
4) Rotate the switching lever 524 and insert the click arm portion 524a into the case 514. Here, since the case has a designed surface, a care should be taken not to scratch it. It should be noted that since the connection portion between the click arm portion 524a and the interior of the case 514 is rearranged in the visible region, no special care need be taken.

Step 212 of FIG. 14 the assembling operation analysis data is displayed, and Step S213 of FIG. 14 calculates the defective assembly generation ratios from the assembling operation analysis data before the improvement shown in FIG. 12 is inputted in step S201 of FIG. 14, the assembling operation analysis data in the improvement plan shown in FIG. 17A inputted in step S211 of FIG. 14, and the defective assembly coefficient DB 42 of FIG. 14. As shown in FIG. 17B, the calculation results are displayed on the display 21. It should be noted that the example in FIG. 17B is expressed by a bar graph but may also be expressed by numerical values. Moreover, the example in FIG. 17B is expressed in percentage but it may also be expressed by the defective assembly generation ratio. Further, in Step 214 the defective assembly generation ratio is displayed on the display 21.

Thus, the designer can examine the concrete improvement plans in the descending order of the improvement effect and can effectively design improvements.

Embodiment 3

Next, explanation will be given of the design support system according to the third embodiment of the present invention.

FIG. 1 shows an outline of the configuration of the design support system according to an embodiment of the present invention. The design support system 1 according to the present invention includes input means 10, output means 20, calculation means 30, and a database unit 40. The input means 10 is formed by a keyboard 11, a mouse 12, and the like. The output means 20 is formed by a display 21, printing means 22, and the like. The calculation means 30 is formed by a CPU 31, a ROM 32, a RAM 33, and an I/O unit 34. The calculation means 30 and the display 21 constitute extraction presentation means. Moreover, the database unit 40 is formed by an assembly difficulty coefficient database 41, a defective assembly coefficient database 42, an assembling time improvement guideline database 43, a defective assembly improvement guideline database 44, an assembling time concrete improvement guideline building database 45, and a defective assembly concrete improvement guideline building database 46.

Next, explanation will be given on an improvement plan for reducing the overall assembling cost in the design support system 1 according to the third embodiment of the present invention.

Figure 18:
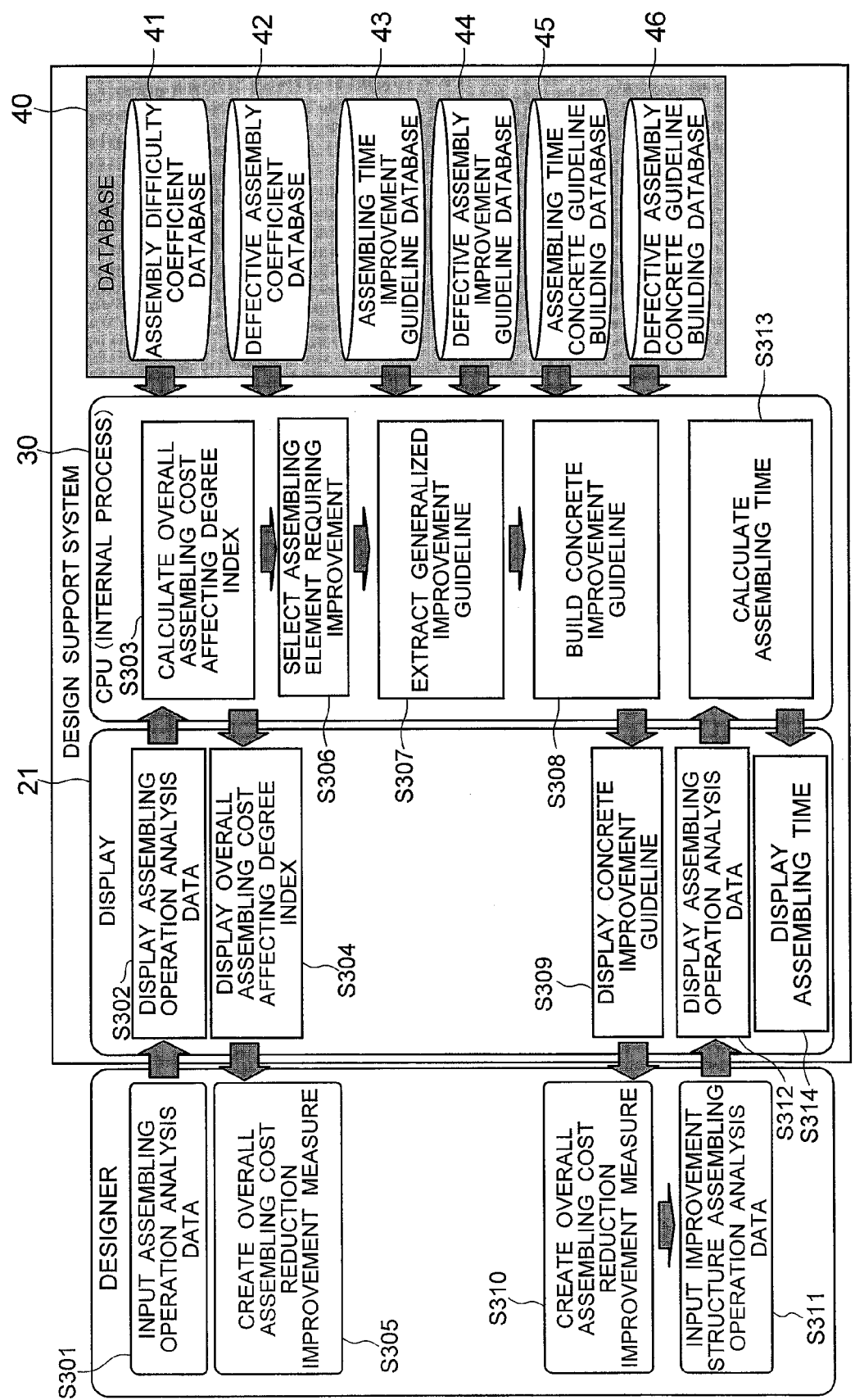
FIG. 18 shows a flow of design support processes in a design support system according to a third embodiment of the present invention.

FIG. 18 shows a design support process flow in the design support system 1 according to the third embodiment. FIG. 19 shows the results of the overall assembling cost affecting degree index calculated in the system from the inputted assembling operation analysis data. FIG. 20 shows the display 21 according to the third embodiment. Moreover, FIG. 21A shows an example of an improvement plan created according to the improvement guideline displayed on the display 21 and its assembling operation analysis data. Furthermore, FIG. 21B shows the improvement effect displayed on the display 21.

1-1 Inputting Assembling Operation Analysis Data

In step S301 of FIG. 18, the assembling operation analysis data is input into the design support system 1. For example, the assembling operations shown in FIG. 3 are analyzed into parts constituting a product, assembling operations of the respective parts, and attributes accompanying the operations, which are summarized as the assembling operation analysis data as shown in FIG. 4B. The designer inputs the analysis data into the design support system 1.

In step S302 of FIG. 18, the design support system 1 displays the inputted assembling operation analysis data on the display 21 as shown in FIG. 4B.

1-2 Calculating the Overall Assembling Cost Affecting Degree Index

In step S303 of FIG. 18, the design support system 1 calculates the overall assembling cost affecting degree index as follows.

(1) The assembly difficulty coefficients of the respective elements in the inputted assembling operation analysis data are extracted from the coefficients of the respective assembling elements stored in the assembling difficulty coefficient database 41 so as to calculate the assembling time affecting degree indexes of the part, assembling operation, and attribute.

(2) By using the calculated assembling time affecting degree index and the assembling cost per unit time, the assembling cost affecting degree is calculated for each of the assembling elements.

(3) The defective assembly coefficients of the respective elements in the inputted assembling operation analysis data are extracted from the coefficients of the respective assembling elements stored in the defective assembly coefficient database 42 so as to calculate the defective assembly affecting degree indexes of the part, assembling operation, and attribute.

(4) The assembling loss cost affecting degree is calculated for each of the assembling elements by using the calculated defective assembly affecting degree index and a loss caused when the defect has occurred.

(5) The total of the assembling costs of the respective assembling elements and the assembling loss cost is divided by the total of the entire assembling cost and the assembling loss cost and multiplied by 100 to calculate the overall assembling cost affecting degree index.

FIG. 19 shows the calculation results of the overall assembling cost affecting degree indexes in this example. The switching lever requires difficult assembling operations such as deforming, rotational, and pressed insert and includes attributes of a high defective assembly potential such as that it is difficult to view the connection portion and that a designed surface exists. Accordingly, the switching lever shows such a high parts assembling time affecting degree index as 99.

In this example, the overall assembling cost affecting degree index of each assembling element is displayed by assuming 100 for the entire assembling time. It should be noted that instead of the overall assembling cost affecting degree index, it is possible to use the overall assembling cost itself.

Moreover, as shown in step S304 of FIG. 18, by displaying the overall assembling cost affecting degree index on the display at this stage, the designer can narrow the improvement objects as shown in step S305.

1-3 Extracting Assembling Elements Requiring Improvements

In step S306 of FIG. 18, the assembling elements requiring improvements are extracted according to the calculated overall assembling cost affecting degree indexes.

In this example, the following three elements having high overall assembling cost affecting degree indexes are extracted.

(1) "switching lever"
(2) "deforming" operation of the switching lever
(3) "rotational" operation of the switching lever 1-4 Extracting Generalized Improvement Plan and Building Concrete Improvement Guideline In step S307 of FIG. 18, a generalized improvement guideline is extracted like in the first and the second embodiments. Furthermore, in step S308 of FIG. 18, a concrete improvement guideline is built like in the first and the second embodiments. In step S309 of FIG. 18, the assembling elements associated with these concrete improvement guidelines are displayed on the display 21 together with the assembling cost affecting degree indexes as shown in FIG. 20.

1-5 Creating Overall Assembling Cost Reduction/Improvement Plan and Analyzing Assembling Operations As shown in FIG. 21A, in step S310 of FIG. 18, the designer can easily create an improvement plan by referencing the concrete improvement guideline of FIG. 20 displayed on the display 21. Furthermore, in step S311 of FIG. 18, the designer analyzes the assembling operations of the created improvement plan and inputs the analyzed data into the design support system 1.

(1) By referencing the improvement guideline 1-1 "in order to reduce the overall assembling cost of the switching lever, divide the part to be assembled and change the assembling order, 1) assemble the part whose assembling is difficult lastly", the designer can create the improvement configuration plan as follows.

"Divide the case 51 into an upper and a lower portion and change the assembling order into the case lower portion 511, the switching lever 521 and the case upper portion 511a." The assembling operations are as follows:

1) Place the case lower portion 511 on the working table.
2) Mount the switching lever 521 on the case lower portion 511. Here, since the surface of the case lower portion 511 is a designed surface, a care should be taken in the assembling operation.
3) Assemble the case upper portion 511a to the case lower portion 511.

(2) By referencing the improvement guideline 1-2 "in order to reduce the overall assembling cost of the switching lever, unify it with another part, 1) outsert molding, 2) use of elasticity of member", the designer can create the following improvement configuration plan.

"Mold the switching button 522 replacing the switching lever 522 together with the case 512 as a unitary block"

By the elasticity of the case 512, the pressed switching button 522 is automatically restored. In this case, at the stage when the case 512 is molded, the member performing the switching lever function is molded and no assembling operation is required.

(3) By referencing the improvement guideline 3-1 "in order to reduce the overall assembling cost of the switching lever in the rotational operation, assemble the switching lever by rectilinear movement, 1) widen the engagement portion tip end, 2) narrow the engagement portion tip end", the designer can create the following improvement configuration plan.

"Narrow the tip end 523a of the switching lever 523 and assemble it by rectilinear movement"

The assembling operation is as follows.

1) Place the case lower portion 513 on the working table.

2) Move the switching lever 523 downward and mount its tip end 523a on the case lower portion 513. Here, since the surface of the case 513 is a designed surface, a care should be taken in the assembling operation.

3) Clinch the switching lever 523 into the case 513. Here, a care should be taken so that the three tip ends 523a of the switching lever are simultaneously engaged with the case.

In step S312 of FIG. 18, the design support system 1 displays the assembling operation analysis data on the inputted improvement configuration plan on the display 21 as shown in FIG. 21A.

1-6 Calculating Overall Assembling Cost

In step S313 of FIG. 18, the respective assembling times and the defective assembly generation ratios are calculated by using the assembling operation analysis data before improvement shown in FIG. 4B inputted in step S301 of FIG. 18, the assembling operation analysis data on the improvement configuration plan shown in FIG. 21A inputted in step S311 of FIG. 18, the assembling difficulty coefficient DB 41 of FIG. 18, and the defective assembly coefficient DB 42 of FIG. 18. Furthermore, the overall assembling cost is calculated by adding the assembling cost associated with the assembling time and the assembling loss cost generated by defective assembly. As shown in FIG. 21B, the calculation results are displayed on the display 21. It should be noted that FIG. 21B shows an example expressed in a bar graph but the results may be expressed by numerical values. Moreover, in the example of FIG. 21B, the results are shown in percentage but the results may also be expressed by the overall assembling cost. In Step 314 of FIG. 18, the assembling time is displayed on the display 21.

Thus, the designer can examine concrete configurations in the descending order of the improvement effects of the improvement plans and can effectively perform improvement design.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A design support method for creating an improvement measure for reducing a product assembling cost in a product design plan to be improved, the design support method comprising:

a storage step for storing as a database, in advance by a central processing unit (CPU), assembly difficulty coefficients indicating the assembling difficulty degrees of assembling operations and attributes accompanying the assembling operations, defective assembly coefficients indicating defective assembly potential degrees of the assembling operations and the attributes accompanying the assembling operations decided according to a plurality of past design examples and data on the assembling operations/attributes and improvement guidelines collected as improvement guidelines for the assembling operations/attributes and assembling time reduction of the assembling operations/attributes and improvement guidelines for the defective assembly reduction and spread in a hierarchy while being correlated with one another, and the assembly difficulty coefficients are updated by using analysis data of assembling operations/attributes, actual measurement values of assembling time for a new product, past analysis data of assembling time for a new product, past analysis data of assembling operations/attributes and past actual measurement values of assembling time for past products;

an input step for inputting, by input means, a plurality of product-constituting parts, assembling operations of the respective parts, and various attributes accompanying the assembling operations in the product design plan;

a calculation step for calculating, by the CPU, a plurality of overall assembling cost affecting degree indexes indicating the affecting degrees affecting an overall assembling cost as a total of assembling costs associated with the assembling time of the product constituting parts, assembling operations of the respective parts, and attributes accompanying the assembling operations and the assembly loss cost generated by the defective assembly generation according to the assembly difficulty coefficients and the defective assembly coefficients read from the database;

a selection step for selecting, by the CPU, a combination of a part, an assembling operation, and an attribute having a high overall assembling cost affecting degree index;

an extraction step for automatically extracting, by the CPU, improvement guidelines to improve the selected part, the selected assembling operation, and the selected attribute from the database;

an improvement guideline building step for automatically building, by the CPU, a concrete improvement guideline from the extracted improvement guidelines and the parts, the assembling operations, and the attributes associated with the extracted improvement guidelines; and a presentation step for automatically displaying, by a display, at least the built-up concrete improvement guideline on a screen.

2. A design support system for creating an improvement measure for reducing a product assembling cost in a product design plan to be improved, the design support system comprising:

a database containing assembly difficulty coefficients indicating the assembling difficulty degrees of assembling operations and attributes accompanying the assembling operations, defective assembly coefficients indicating defective assembly potential degrees of the assembling operations and the attributes accompanying the assembling operations decided according to a plurality of past design examples and data on the assembling operations/attributes and improvement guidelines collected as improvement guidelines for the assembling operations/attributes and assembling time reduction of the assembling operations/attributes and improvement guidelines for the defective assembly reduction and spread in a hierarchy while being correlated with one another, and the assembly difficulty coefficients are updated by using analysis data of assembling operations/attributes, actual measurement values of assembling time for a new product, past analysis data of assembling operations/attributes and past actual measurement values of assembling time for past products;

input means for inputting a plurality of product-constituting parts, assembling operations of the respective parts, and various attributes accompanying the assembling operations in the product design plan;

calculation means for calculating a plurality of overall assembling cost affecting degree indexes indicating the affecting degrees affecting an overall assembling cost as a total of assembling costs associated with the assembling time of the product constituting parts, assembling operations of the respective parts, and attributes accompanying the assembling operations and the assembly loss cost generated by the defective assembly generation according to the assembly difficulty coefficients and the defective assembly coefficients read from the database;

selection means for selecting a combination of a part, an assembling operation, and an attribute having a high overall assembling cost affecting degree index;

extraction means for automatically extracting improvement guidelines to improve the selected part, the selected assembling operation, and the selected attribute from the database;

improvement guideline building means for automatically building a concrete improvement guideline from the extracted improvement guidelines and the parts, the assembling operations, and the attributes associated with the extracted improvement guidelines; and presentation means for automatically displaying at least the built-up concrete improvement guideline on a screen.

3. A design support method for creating an improvement measure for reducing a product assembling cost in a product design plan to be improved, the design support method comprising:

a storage step for storing as a database, in advance by the central processing unit (CPU), assembly difficulty coefficients indicating the assembling difficulty degrees of assembling operations and attributes accompanying the assembling operations, defective assembly coefficients indicating defective assembly potential degrees of the assembling operations and the attributes accompanying the assembling operations decided according to a plurality of past design examples in the past and data on the assembling operations/attributes and improvement guidelines collected as improvement guidelines for the assembling operations/attributes and assembling time reduction of the assembling operations/attributes and improvement guidelines for the defective assembly reduction and spread in a hierarchy while being correlated with one another, and the assembly difficulty coefficients are updated by using analysis data of assembling operations/attributes, actual measurement values of assembling time for a new product, past analysis data of assembling operations/attributes and past actual measurement values of assembling time for products;

an input step for inputting, by input means, a plurality of product-constituting parts, assembling operations of the respective parts, and various attributes accompanying the assembling operations in the product design plan;

a calculation step for calculating, by the CPU, a plurality of overall assembling cost affecting degree indexes indicating the affecting degrees affecting an overall assembling cost as a total of assembling costs associated with the assembling time of the product constituting parts, assembling operations of the respective parts, and attributes accompanying the assembling operations and the assembly loss cost generated by the defective assembly generation according to the assembly difficulty coefficients and the defective assembly coefficients read from the database;

a selection step for selecting, by the CPU, a combination of a part, an assembling operation, and an attribute having a high overall assembling cost affecting degree index;

an extraction step for automatically extracting, by the CPU, improvement guidelines to improve the selected part, the selected assembling operation, and the selected attribute from the database;

an improvement guideline building step for automatically building, by the CPU, a concrete improvement guideline from the extracted improvement guidelines and the parts, the assembling operations, and the attributes associated with the extracted improvement guidelines;

a presentation step for automatically displaying, by a display, at least the built-up concrete improvement guideline on a screen;

an input step for inputting, by the input means, parts, assembling operation of the respective parts, various attributes accompanying the assembling operations in the improvement measure created according to the presented improvement guideline;

a calculation step for calculating, by the CPU, an overall assembling cost obtained by adding an assembling cost associated with an assembling time from an assembly difficulty coefficient and a defective assembly coefficient read from the database and parts, assembling operations of the respective parts, and attributes accompanying the assembling operations in the improvement measure to an assembly loss cost generated by the defective assembly generation; and a presentation step for automatically displaying, by the display the calculated overall assembling cost on the screen.

4. A design support system for creating an improvement measure for reducing a product assembling cost in a product design plan to be improved, the design support system comprising:

a database containing assembly difficulty coefficients indicating the assembling difficulty degrees of assembling operations and attributes accompanying the assembling operations, defective assembly coefficients indicating defective assembly potential degrees of the assembling operations and the attributes accompanying the assembling operations decided according to a plurality of past design examples and data on the assembling operations/attributes and improvement guidelines collected as improvement guidelines for the assembling operations/attributes and assembling time reduction of the assembling operations/attributes and improvement guidelines for the defective assembly reduction and spread in a hierarchy while being correlated with one another, and the assembly difficulty coefficients are updated by using analysis data of assembling operations/attributes, actual measurement values of assembling time for a new product, past analysis data of assembling operations/attributes and past actual measurement values of assembling time for past products;

input means for inputting a plurality of product-constituting parts, assembling operations of the respective parts, and various attributes accompanying the assembling operations in the product design plan;

calculation means for calculating a plurality of overall assembling cost affecting degree indexes indicating the affecting degrees affecting an overall assembling cost as a total of assembling costs associated with the assembling time of the product constituting parts, assembling operations of the respective parts, and attributes accompanying the assembling operations and the assembly loss cost generated by the defective assembly generation according to the assembly difficulty coefficients and the defective assembly coefficients read from the database;

selection means for selecting a combination of a part, an assembling operation, and an attribute having a high overall assembling cost affecting degree index;

extraction means for automatically extracting improvement guidelines to improve the selected part, the selected assembling operation, and the selected attribute from the database;

improvement guideline building means for automatically building a concrete improvement guideline from the extracted improvement guidelines and the parts, the assembling operations, and the attributes associated with the extracted improvement guidelines;

presentation means for automatically displaying at least the built-up concrete improvement guideline on a screen;

input means for inputting parts, assembling operations of the respective parts, and various attributes accompanying the assembling operations in the improvement measure created according to the presented improvement guideline;

calculation means for calculating an overall assembling cost obtained by adding an assembling cost associated with an assembling time from an assembly difficulty coefficient and a defective assembly coefficient read from the database and parts, assembling operations of the respective parts, and attributes accompanying the assembling operations in the improvement measure to an assembly loss cost generated by the defective assembly generation; and presentation means for automatically displaying the calculated overall assembling cost on the screen.

* * * * *